US012681503B2

(12) United States Patent (10) Patent No.: US 12,681,503 B2
Matsumoto (45) Date of Patent: Jul. 14, 2026

(54) CONTROL DEVICE AND METHOD FOR CONTROLLING UNMANNED VEHICLE MOVEMENT BASED ON USER TERMINAL OPERATION IN MOBILE SALES

(71) Applicant: Rakuten Group, Inc., Tokyo (JP)

(72) Inventor: Asaki Matsumoto, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 34 days.

(21) Appl. No.: 18/671,358

(22) Filed: May 22, 2024

(65) Prior Publication Data

US 2024/0402729 A1 Dec. 5, 2024

(30) Foreign Application Priority Data

May 31, 2023 (JP) ................................. 2023-089771

(51) Int. Cl.
*G05D 1/667* (2024.01)
*G06Q 10/083* (2023.01)
*G05D 105/28* (2024.01)
*G05D 109/10* (2024.01)
*G05D 109/25* (2024.01)

(52) U.S. Cl.
CPC ........... *G05D 1/667* (2024.01); *G06Q 10/083* (2013.01); *G05D 2105/28* (2024.01); *G05D 2109/10* (2024.01); *G05D 2109/254* (2024.01)

(58) Field of Classification Search
CPC ............. G05D 1/667; G05D 2109/254; G05D 2109/10; G05D 2105/28; G06Q 10/083
See application file for complete search history.

(56) References Cited

U.S. PATENT DOCUMENTS

| | | | |
|---|---|---|---|
| 10,037,519 B2 * | 7/2018 | Proud ................... | G06Q 20/202 |
| 11,392,864 B2 * | 7/2022 | Qiu ..................... | G01C 21/3453 |
| 11,640,588 B2 * | 5/2023 | Sugano ............. | B62D 15/0285 |
| | | | 340/932.2 |
| 12,412,166 B2 * | 9/2025 | Kawata ............. | G06Q 30/0639 |
| 2017/0124547 A1 * | 5/2017 | Natarajan ............ | G06Q 20/202 |
| 2020/0250594 A1 | 8/2020 | Qiu et al. | |

FOREIGN PATENT DOCUMENTS

| | | |
|---|---|---|
| JP | 2002-73941 A | 3/2002 |
| JP | 2020-126559 A | 8/2020 |
| JP | 2021-527866 A | 10/2021 |
| WO | 2020/067071 A1 | 4/2020 |

* cited by examiner

*Primary Examiner* — Ramsey Refai
(74) *Attorney, Agent, or Firm* — Sughrue Mion, PLLC

(57) ABSTRACT

When the UV for performing mobile sales of a mobile sales item is located in a sales area, the movement control system S identifies an operation situation on the user terminal 3 of the user in the sales area, the operation situation being an operation situation of the user with respect to the mobile sales item, and performs movement control of the unmanned vehicle on the basis of the identified operation situation.

16 Claims, 12 Drawing Sheets

| OPERATION SITUATION | ORDER LEVEL | MOVEMENT PATH |
|---|---|---|
| BEFORE EXECUTION OF STORE BROWSING OPERATION | 0 | R0 (NORMAL ROUTE) |
| BEFORE EXECUTION OF ITEM BROWSING OPERATION AFTER EXECUTION OF STORE BROWSING OPERATION | 1 | R1 |
| BEFORE EXECUTION OF CART REGISTRATION OPERATION AFTER EXECUTION OF ITEM BROWSING OPERATION | 2 | R2 |
| BEFORE EXECUTION OF ORDER PROCEEDING OPERATION AFTER EXECUTION OF CART REGISTRATION OPERATION | 3 | R3 |
| BEFORE EXECUTION OF ORDER CONFIRMATION OPERATION AFTER EXECUTION OF ORDER PROCEEDING OPERATION | 4 | R4 |

| USER ATTRIBUTE | OPERATION SITUATION | ORDER LEVEL | MOVEMENT SPEED |
|---|---|---|---|
| NORMAL USER | BEFORE EXECUTION OF STORE BROWSING OPERATION (NOT PRESENT ON MOVEMENT PATH) | 0—1 | 13m/s(NORMAL SPEED) |
| | BEFORE EXECUTION OF STORE BROWSING OPERATION (PRESENT ON MOVEMENT PATH) | 0—2 | 10m/s |
| | BEFORE EXECUTION OF ITEM BROWSING OPERATION AFTER EXECUTION OF STORE BROWSING OPERATION | 1 | 8m/s |
| | BEFORE EXECUTION OF CART REGISTRATION OPERATION AFTER EXECUTION OF ITEM BROWSING OPERATION | 2 | 7m/s |
| | BEFORE EXECUTION OF ORDER PROCEEDING OPERATION AFTER EXECUTION OF CART REGISTRATION OPERATION | 3 | 6m/s |
| | BEFORE EXECUTION OF ORDER CONFIRMATION OPERATION AFTER EXECUTION OF ORDER PROCEEDING OPERATION | 4 | 5m/s |
| HEAVY USER | BEFORE EXECUTION OF STORE BROWSING OPERATION (NOT PRESENT ON MOVEMENT PATH) | 0—1 | 13m/s(NORMAL SPEED) |
| | BEFORE EXECUTION OF STORE BROWSING OPERATION (PRESENT ON MOVEMENT PATH) | 0—2 | 8m/s |
| | BEFORE EXECUTION OF ITEM BROWSING OPERATION AFTER EXECUTION OF STORE BROWSING OPERATION | 1 | 7m/s |
| | BEFORE EXECUTION OF CART REGISTRATION OPERATION AFTER EXECUTION OF ITEM BROWSING OPERATION | 2 | 6m/s |
| | BEFORE EXECUTION OF ORDER PROCEEDING OPERATION AFTER EXECUTION OF CART REGISTRATION OPERATION | 3 | 5m/s |
| | BEFORE EXECUTION OF ORDER CONFIRMATION OPERATION AFTER EXECUTION OF ORDER PROCEEDING OPERATION | 4 | 4m/s |

FIG. 9

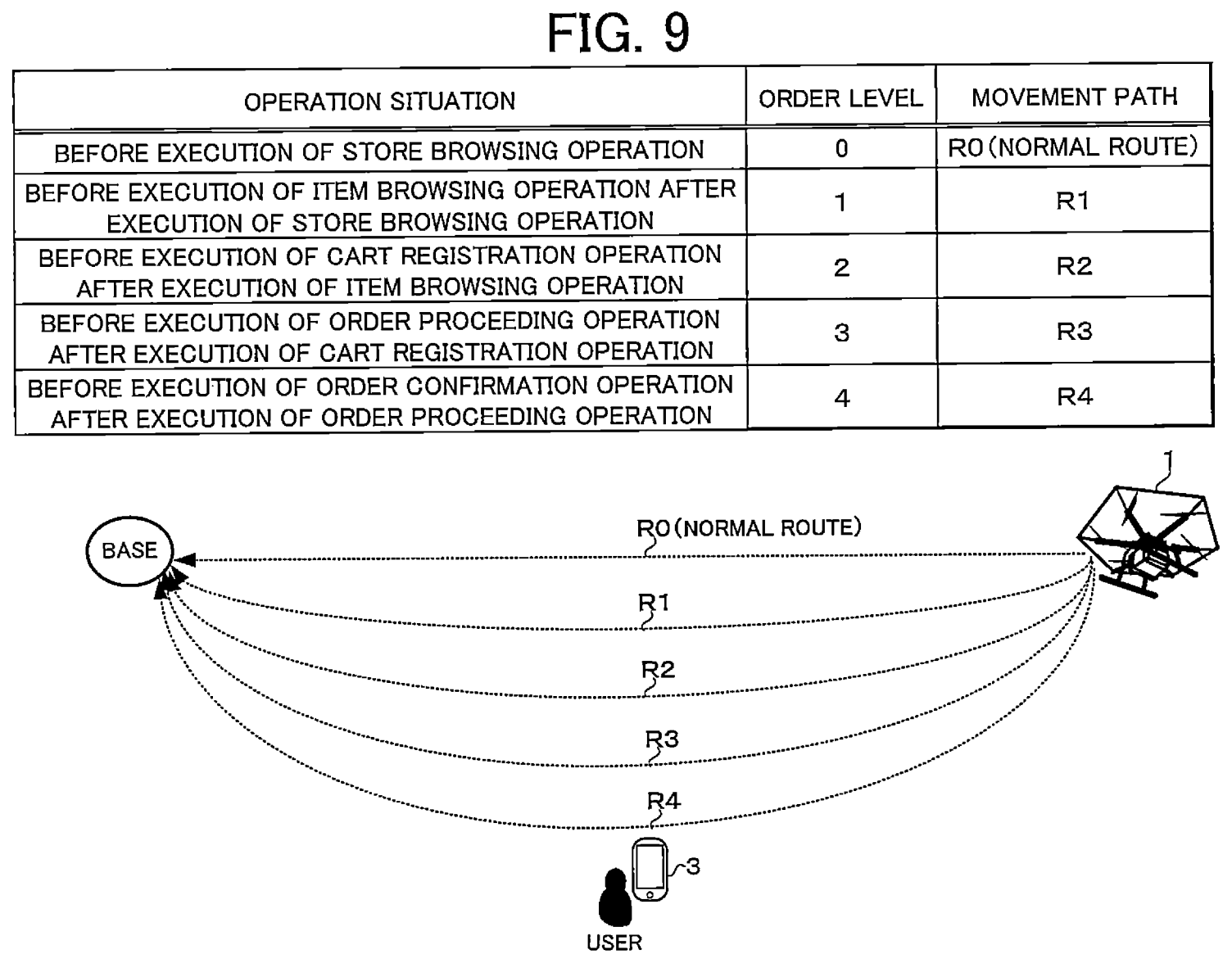

| OPERATION SITUATION | ORDER LEVEL | MOVEMENT PATH |
|---|---|---|
| | | R0 (NORMAL ROUTE) |
| BEFORE EXECUTION OF STORE BROWSING OPERATION | 0 | |
| BEFORE EXECUTION OF ITEM BROWSING OPERATION AFTER EXECUTION OF STORE BROWSING OPERATION | 1 | R1 |
| BEFORE EXECUTION OF CART REGISTRATION OPERATION AFTER EXECUTION OF ITEM BROWSING OPERATION | 2 | R2 |
| BEFORE EXECUTION OF ORDER PROCEEDING OPERATION AFTER EXECUTION OF CART REGISTRATION OPERATION | 3 | R3 |
| BEFORE EXECUTION OF ORDER CONFIRMATION OPERATION AFTER EXECUTION OF ORDER PROCEEDING OPERATION | 4 | R4 |

R0 (NORMAL ROUTE)

R1

R2

R3

R4

BASE

USER

CONTROL DEVICE AND METHOD FOR CONTROLLING UNMANNED VEHICLE MOVEMENT BASED ON USER TERMINAL OPERATION IN MOBILE SALES

CROSS REFERENCE TO RELATED APPLICATION

This application claims priority from Japanese Patent Application No. 2023-89771 which was filed on May 31, 2023, the disclosure of which is herein incorporated by reference in its entirety.

TECHNICAL FIELD

One or more embodiments of the present invention relates to a technical field such as a method of controlling an unmanned vehicle for performing mobile sales of an item.

RELATED ART

Conventionally, a mobile sales method of selling items while moving to a place where attraction of customers can be expected using mobile sales vehicles has been known. For example, JP 2002-73941 A discloses a mobile sales method for mainly enabling efficient mobile sales.

By the way, in the case of mobile sales using an unmanned vehicle such as a drone, in order to efficiently sell an item, it is desirable to determine the degree of interest in the item in real time during movement of the unmanned vehicle and efficiently control the movement of the unmanned vehicle.

Therefore, one or more embodiments of the present invention are to providing a control device, a movement control method for an unmanned vehicle, and a non-transitory computer readable memory which are capable of determining a degree of interest in an item to be subjected to the mobile sales in real time and efficiently performing movement control of an unmanned vehicle.

SUMMARY (An aspect 1) In response to the above issue, A control device includes: at least one memory configured to store program code; and at least one processor configured to access the program code and operate as instructed by the program code. The program code includes: identification code configured to cause the at least one processor to identify an operation situation on a terminal used by a user in a sales area when an unmanned vehicle is moving to perform mobile sales of an item, the operation situation being an operation situation of the user with respect to the item; and movement control code configured to cause the at least one processor to perform movement control of the unmanned vehicle on the basis of the operation situation of the user.

(An aspect 2) A movement control method executed by one or more computers, includes: identifying an operation situation on a terminal used by a user in a sales area when an unmanned vehicle is moving to perform mobile sales of an item, the operation situation being an operation situation of the user with respect to the item; and performing movement control of the unmanned vehicle on the basis of the operation situation of the user.

(An aspect 3) A non-transitory computer readable memory has stored thereon a program configured to cause a computer to: identify an operation situation on a terminal used by a user in a sales area when an unmanned vehicle is moving to perform mobile sales of an item, the operation situation being an operation situation of the user with respect to the item; and perform movement control of the unmanned vehicle on the basis of the operation situation of the user.

BRIEF DESCRIPTION OF THE DRAWINGS

FIG. 8 is a view illustrating, for each user attribute, an example of a correspondence relationships among operation situations of the user with respect to a mobile sales item, order levels, and movement speeds of the UAV 1.

FIG. 9 is a view illustrating an example of a correspondence relationships among operation situations of the user with respect to a mobile sales item, order levels, and movement paths of the UAV 1.

DETAILED DESCRIPTION

Hereinafter, a movement control system according to an embodiment of the present invention will be described with reference to the drawings. The following embodiment is an embodiment in a case where the present invention is applied to a movement control system capable of performing movement control of an unmanned vehicle for performing mobile sales of items (an example of an article). An UAV (Unmanned Aerial Vehicle) that can fly in the air (in the atmosphere) in an unmanned manner or an UGV (Unmanned Ground Vehicle) that can travel on the ground in an unmanned manner is taken as an example of the unmanned vehicle. The UAV is also called a drone or a multi-copter. Incidentally, the UAV may be an unmanned flying robot. The UGV may be a two-wheeled or four-wheeled vehicle (unmanned ground vehicle). Hereinafter, the unmanned vehicle for performing mobile sales will be appropriately referred to as an "UV (Unmanned Vehicle)". Hereinafter, an item (e.g., product) to be subjected to the mobile sales (that is, item targeted for mobile sales) will be appropriately referred to as a "mobile sales item". Moreover, the UV can also be used for delivery of an article. Hereinafter, the article to be delivered is appropriately referred to as a "delivery request item". The delivery request item is an item ordered, for example, on an EC (Electronic Commerce) site and requested to be delivered by a delivery requester. Alternatively, the delivery request item may be a cargo requested to be delivered by a requester, for example, at a delivery site. The UV for performing the mobile sales of the mobile sales item may be a UV for performing delivery of the delivery request item, or may be a UV different from the UV for performing the delivery of the delivery request item.

[1. Configuration and Operation Outline of Movement Control System S]

Figure 1:
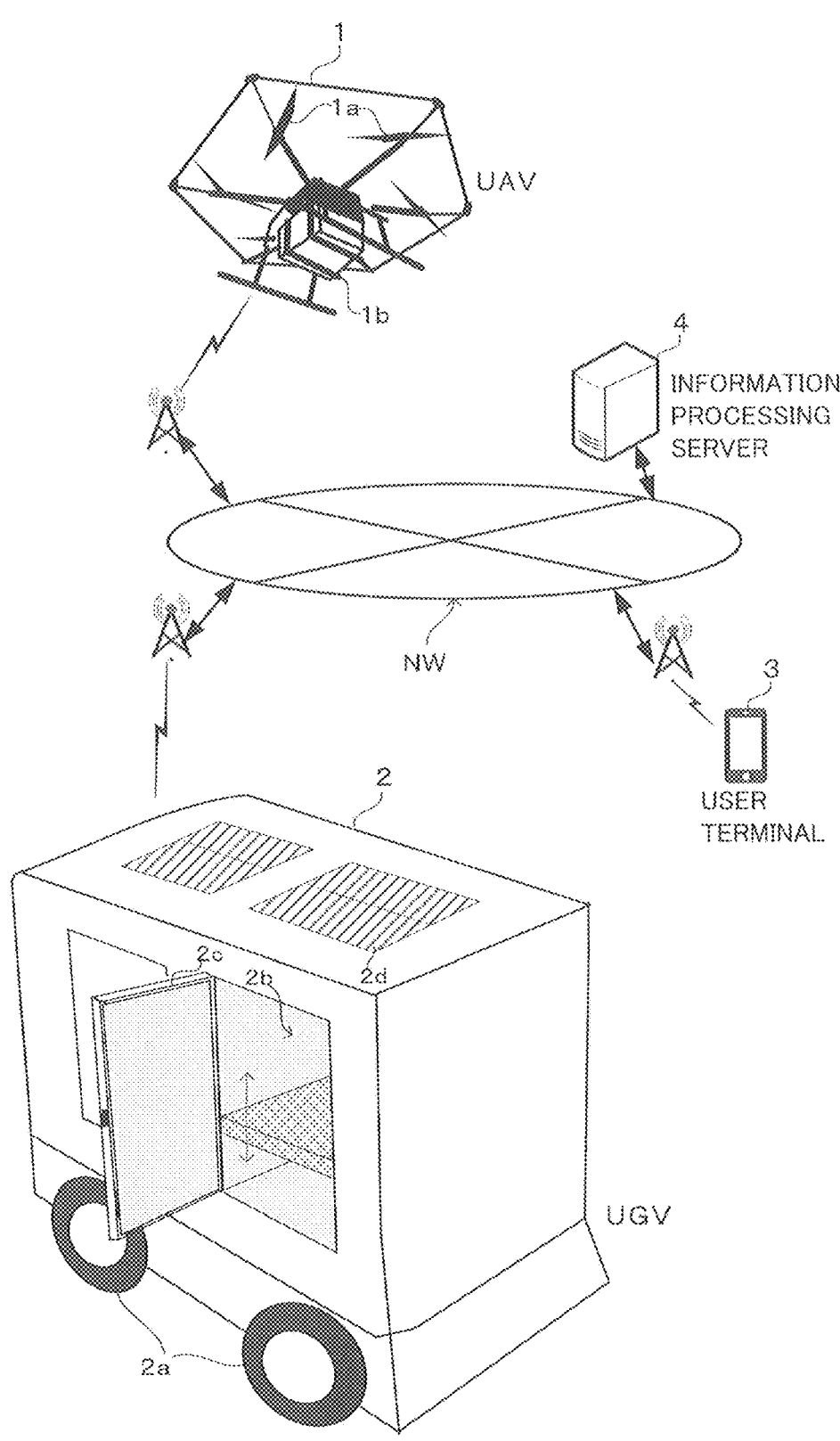
FIG. 1 is a diagram illustrating a schematic configuration example of a movement control system S.

First, a configuration and operation outline of a movement control system S according to the present embodiment will be described with reference to FIG. 1. FIG. 1 is a diagram illustrating a schematic configuration example of the movement control system S. As illustrated in FIG. 1, the movement control system S includes a UAV 1, a UGV 2, a user terminal 3, and an information processing server 4, which can be connected to a communication network NW. Incidentally, although one UAV 1 and one UGV 2 are illustrated in FIG. 1, the movement control system S may include a plurality of UAVs 1 and a plurality of UGVs 2. The communication network NW includes, for example, the Internet, a wireless communication network, a wireless base station thereof, and the like. The UAV 1, the UGV 2, the user terminal 3, and the information processing server 4 can communicate with each other via the communication network NW. As the user terminal 3, for example, a mobile terminal such as a smartphone can be applied. The information processing server 4 is a server for managing and controlling delivery of one or more delivery request items and mobile sales of one or more mobile sales items. Furthermore, the information processing server 4 serves as a control device and controls the UAV 1 or the UGV 2.

Incidentally, the UAV 1 is managed by a GCS (Ground Control Station), and can be remotely operated by an operator from the ground. The GCS is mounted on, for example, a pilot terminal that can be connected to the communication network NW as an application. In this case, the operator is, for example, a person who operates the pilot terminal or a controller included in the pilot terminal. Alternatively, the GCS may be systematized by a server or the like. In this case, the operator is, for example, a system administrator or a controller included in the server.

Figure 2:
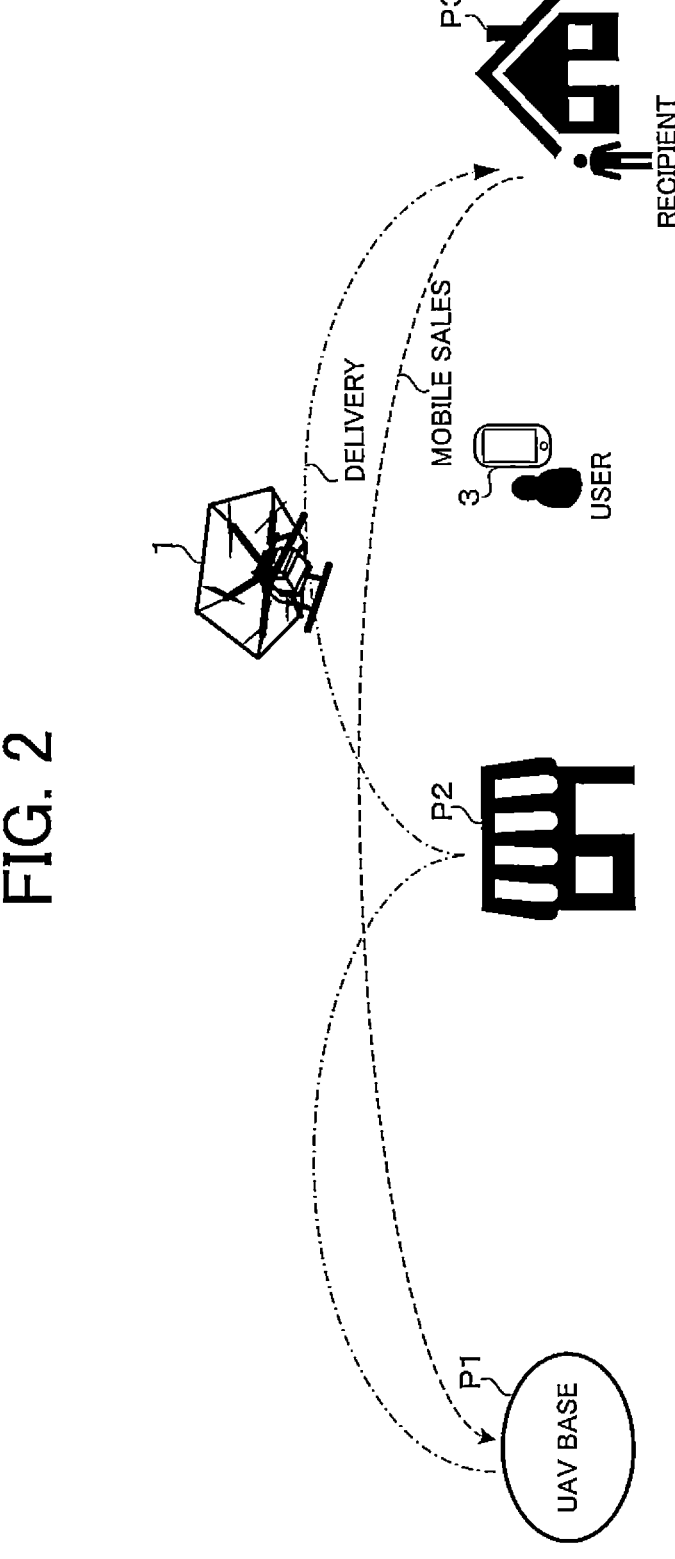
FIG. 2 is a conceptual diagram illustrating a state in which a delivery of a delivery request item and mobile sales of a mobile sales item are performed by one UAV 1.

FIG. 2 is a conceptual diagram illustrating a state in which the delivery of the delivery request item and the mobile sales of the mobile sales item are performed by one UAV 1. In the example of FIG. 2, the UAV 1 departs (takes off) from the UAV base P1 toward the store P2 that is a delivery source, and loads the delivery request item requested to be delivered when arriving at the store P2. For example, in the state where the UAV 1 lands on a land of the store P2, the delivery request item is loaded into the UAV 1 by a staff of the store P2. At this time, the staff of the store P2 checks a vacant space in the UAV 1, and loads the mobile sales item. Then, the UAV 1 departs from the store P2 toward the delivery destination P3 and provides the delivery request item to a recipient (for example, the delivery requester) when arriving at the delivery destination P3. After the delivery of the delivery request item is completed, the UAV 1 moves along a movement path (for example, a return path for returning to the UAV base P1) in a predetermined sales area, and provides (that is, moves to a current position of a user and provides) the user with the mobile sales item ordered via the user terminal 3 by the user present within a predetermined range (for example, 50 m to 1 km although not particularly limited) from the UAV 1.

Incidentally, the delivery of the delivery request item may be performed by the UAV 1, and the mobile sales of the mobile sales item may be performed by the UGV 2. In this case, after the delivery of the delivery request item is completed, the UAV 1 transfers the mobile sales item to the UGV 2 at a UGV base, for example. That is, the mobile sales item is taken over from the UAV 1 to the UGV 2. Thereafter, the UGV 2 moves along a movement path (for example, a movement path determined in advance) in a predetermined sales area, and provides the user with the mobile sales item ordered via the user terminal 3 by the user present within a predetermined range from the UGV 2. Incidentally, for example, the UGV 2 may move to a store that handles the mobile sales item and load the mobile sales item. In this case, the mobile sales item does not need to be loaded into the UAV 1 that delivers the delivery request item.

[1-1. Configuration and Function of UAV 1]

Figure 3:
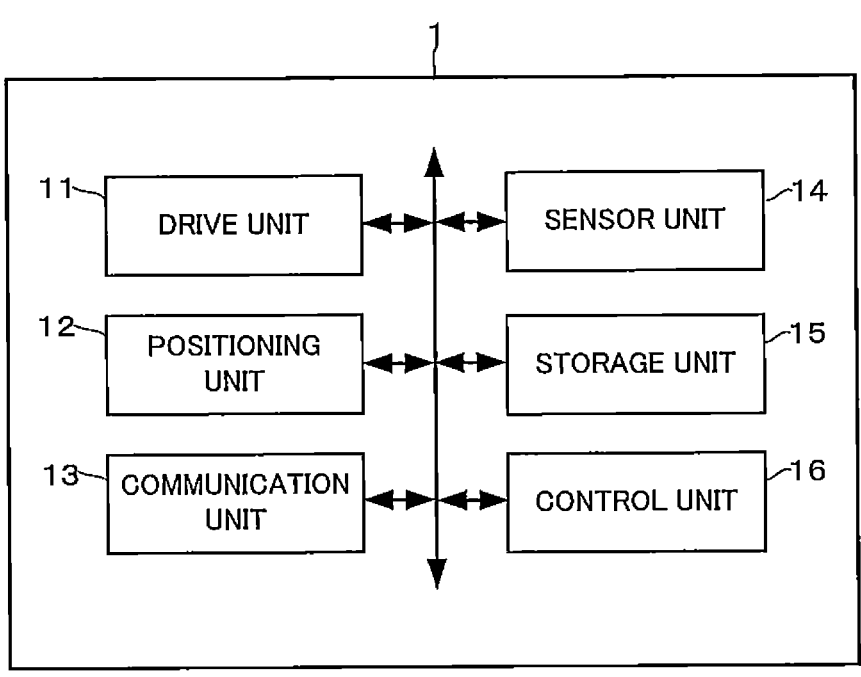
FIG. 3 is a diagram illustrating a schematic configuration example of an UAV 1.

Next, a configuration and a function of the UAV 1 will be described with reference to FIGS. 1 and 3. FIG. 3 is a diagram illustrating a schematic configuration example of the UAV 1. As illustrated in FIG. 3, the UAV 1 includes a drive unit 11, a positioning unit 12, a communication unit 13, a sensor unit 14, a storage unit 15, a control unit 16, and the like, and includes a battery (not illustrated) that supplies power to these units. Moreover, as illustrated in FIG. 1, the UAV 1 includes rotors (propellers) 1a, which are horizontal rotary wings, a holding member 1b that holds one or a plurality of articles (at least any one of the delivery request item and the mobile sales item) to be loaded, and the like. The holding member 1b may hold a storage box that stores the article. The holding member 1b may be a member that hooks the article or the storage box thereof. Although not illustrated, the UAV 1 includes a holding mechanism and the like. The holding mechanism includes an actuator configured using a motor and the like. The holding mechanism drives the actuator according to a control signal output from the control unit 16 to release the article (that is, separate the article) from the holding member 1b. Incidentally, the holding mechanism may include a linear member such as a wire connected to the holding member 1b, and a reel (winch) for unwinding or winding the linear member.

The drive unit 11 includes a motor, a rotation shaft, and the like. The drive unit 11 rotates the plurality of rotors 1a by the motor, driven in accordance with a control signal output from the control unit 16, the rotation shaft, and the like. The positioning unit 12 includes a radio receiver, an altitude sensor, and the like. The positioning unit 12 receives, for example, a radio wave transmitted from a GNSS (Global Navigation Satellite System) satellite by the radio receiver, and detects a current position (latitude and longitude) of the UAV 1 in the horizontal direction based on the radio wave. Incidentally, the current position of the UAV 1 in the horizontal direction may be corrected based on an image captured by a camera of the sensor unit 14. Position information indicating the current position detected by the positioning unit 12 is output to the control unit 16. Furthermore, the positioning unit 12 may detect a current position (altitude) of the UAV 1 in the vertical direction by the altitude sensor such as an atmospheric pressure sensor. In this case, the position information includes altitude information indicating the altitude of the UAV 1. The communication unit 13 has a wireless communication function and is responsible for controlling communication performed via the communication network NW.

The sensor unit 14 includes various sensors used for flight control of the UAV 1 and the like. Examples of the various sensors include an optical sensor, a triaxial angular velocity sensor, a triaxial acceleration sensor, and a geomagnetic sensor. The optical sensor includes a camera (for example, an RGB camera or an infrared camera), and continuously captures images of a real space in a range falling within an angle of view of the camera. Incidentally, the optical sensor may include a LiDAR (Light Detection and Ranging or Laser Imaging Detection and Ranging) sensor that measures a shape of a feature or a distance to the feature. Furthermore, sensing information obtained by sensing of the sensor unit 14 is output to the control unit 16.

The storage unit 15 is configured using a non-volatile memory or the like, and stores various programs and data. Moreover, the storage unit 15 stores a vehicle ID of the UAV 1. The control unit 16 includes at least one CPU (Central Processing Unit), a ROM (Read Only Memory), a RAM (Random Access Memory), and the like, and executes various types of control according to a program stored in the ROM (or the storage unit 15). The various types of control include flight control (including takeoff control and landing control) and article transfer control. In the flight control, the control unit 16 controls rotation speeds of the rotors 1*a*, a position, an attitude, and a traveling direction of the UAV 1 using the position information acquired from the positioning unit 12, the sensing information acquired from the sensor unit 14, and the like.

In a case where the UAV 1 is used for delivery of the delivery request item, delivery plan information acquired from the information processing server 4 is used in the flight control. Here, the delivery plan information includes, for example, article information of the delivery request item, position information of a delivery destination, a delivery path (delivery route), and a delivery schedule including a scheduled delivery date. The position information of the delivery destination may be represented by latitude and longitude, or may be represented by an address or the like of the recipient. The scheduled delivery date indicates, for example, the date on which the delivery request item is delivered to the delivery destination, or the date and scheduled time (or scheduled time zone).

Moreover, in a case where the UAV 1 is used for mobile sales of the mobile sales item, mobile sales plan information acquired from the information processing server 4 is used in the flight control. The mobile sales plan information includes, for example, article information of the mobile sales item, position information of a sales area, a mobile sales schedule including a scheduled mobile sales date, and an initially set movement method (flight method) of the UAV 1. Here, the scheduled mobile sales date indicates, for example, the date on which the mobile sales item is moved and sold or the date and scheduled time (or scheduled time zone). The position information of the sales area is represented by, for example, latitude and longitude of all points included in the sales area. Incidentally, the scheduled mobile sales date may be the same as the scheduled delivery date, or may be after the scheduled time indicated by the scheduled delivery date. The initially set movement method of the UAV 1 includes at least any one of the movement path (flight path) of the UAV 1 and a movement speed (flight speed) of the UAV 1. Incidentally, the movement path of the UAV 1 is, for example, a movement path on a two-dimensional plane represented by latitude and longitude (position information of the movement path).

Furthermore, movement control information acquired from the information processing server 4 is used in the flight control. The movement control information includes a movement method (flight method of the UAV 1) determined based on an operation situation of a user (user in the sales area) with respect to the mobile sales item. The movement method includes at least any one of a movement path (flight path) of the UAV 1 and a movement speed (flight speed) of the UAV 1, and can be changed from the initially set movement method. Incidentally, the movement control information may include an article ID of the mobile sales item ordered by the user and position information indicating a current position of the user who has ordered the mobile sales item (a current position of the user terminal 3).

The control unit 16 can cause the UAV 1 to autonomously fly toward the delivery destination indicated by the delivery plan information. Moreover, the control unit 16 can cause the UAV 1 to autonomously fly according to the mobile sales plan information or the movement control information. For example, the control unit 16 can cause the UAV 1 to autonomously fly along the movement path (i.e., in accordance with position information of the movement path) indicated by the mobile sales plan information or the movement control information. Incidentally, the autonomous flight of the UAV 1 is not limited to autonomous flight obtained as the control unit 16 included in the UAV 1 performs the flight control, and the autonomous flight of the UAV 1 also includes autonomous flight obtained by performing autonomous control as the entire system. At least any one of the delivery plan information, the mobile sales plan information, and the movement control information may be acquired from the GCS. In this case, the GCS acquires at least any one of the delivery plan information, the mobile sales plan information, and the movement control information from the information processing server 4. During the flight of the UAV 1, the position information of the UAV 1 is sequentially transmitted to the information processing server 4 by the communication unit 13 together with the vehicle ID of the UAV 1.

Moreover, in the article transfer control, for example, the control unit 16 provides the article to the recipient (that is, a recipient of the delivery request item or the user who has ordered the mobile sales item) by causing the UAV 1 in the landing state to release the article from the holding member 1*b* by the holding mechanism. Alternatively, the control unit 16 provides the article to the recipient by causing the UAV 1 in a hovering state to release (that is, drop) the article from the holding member 1*b* by the holding mechanism. In this case, hovering is desirably performed, for example, at a position about several tens of cm to 1 m away in the vertical direction. Alternatively, the control unit 16 provides the article to the recipient by causing the UAV 1 in the hovering state to unwind the linear member downward by the holding mechanism. Incidentally, there is also a case where the mobile sales item is provided from the UAV 1 used for the delivery of the delivery request item to the UAV 1 or the UGV 2 used for the mobile sales of the mobile sales item by the article transfer control.

[1-2. Configuration and Function of UGV 2]

Figure 4:
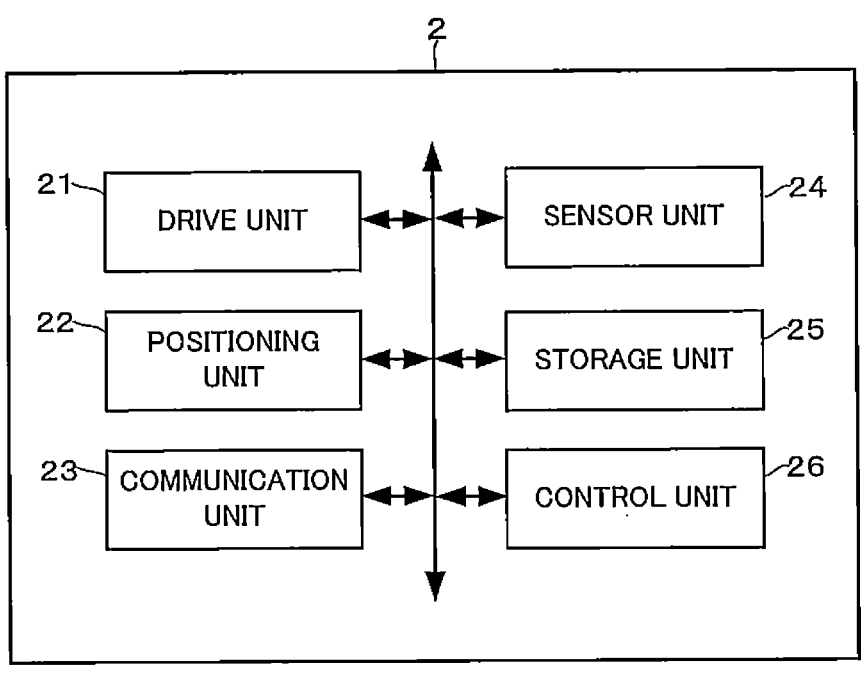
FIG. 4 is a diagram illustrating a schematic configuration example of an UGV 2.

Next, a configuration and a function of the UGV 2 will be described with reference to FIGS. 1 and 4. FIG. 4 is a diagram illustrating a schematic configuration example of the UGV 2. As illustrated in FIG. 4, the UGV 2 includes a drive unit 21, a positioning unit 22, a communication unit 23, a sensor unit 24, a storage unit 25, a control unit 26, and the like, and includes a battery (not illustrated) that supplies power to these units. Moreover, as illustrated in FIG. 1, the UGV 2 includes wheels 2*a*, housing portions 2*b* for housing one or a plurality of articles (at least any one of a delivery request item and a mobile sales item) to be loaded, side doors 2c, ceiling doors 2d, and the like. The side door 2c is provided so as to close a side opening of the housing portion 2b. The article is transferred between the UGV 2 and the recipient through the side opening of the housing portion 2b. The ceiling door 2d is provided so as to close a ceiling opening of the housing portion 2b. The article is transferred between the UAV 1 and the UGV 2 through the ceiling opening of the housing portion 2b. Furthermore, the UGV 2 includes a side door opening/closing mechanism, a ceiling door opening/closing mechanism, and the like although not illustrated.

The drive unit 21 includes a motor, a rotation shaft, and the like. The plurality of wheels 2a are rotated by the motor, driven in accordance with a control signal output from the control unit 26, the rotation shaft, and the like. The positioning unit 22 includes a radio receiver and the like. The positioning unit 22 receives, for example, a radio wave transmitted from a GNSS satellite by the radio receiver, and detects a current position (latitude and longitude) of the UGV 2 based on the radio wave. Incidentally, the current position of the UGV 2 may be identified by SLAM (Simultaneous Localization And Mapping) processing in addition to the radio wave transmitted from the GNSS satellite. The current position of the UGV 2 may be corrected based on an image captured by a camera of the sensor unit 24. The position information indicating the current position detected by the positioning unit 22 is output to the control unit 26. The communication unit 23 controls communication performed via the communication network NW.

The sensor unit 24 includes various sensors used for travel control of the UGV 2 and the like. Examples of the various sensors include an optical sensor and the like. The optical sensor includes a camera (for example, an RGB camera or an infrared camera), and continuously captures images of a real space in a range falling within an angle of view of the camera. Sensing information obtained by sensing of the sensor unit 24 is output to the control unit 26. A vehicle ID of the UGV 2 is identification information for identifying the UGV 2.

The storage unit 25 is configured using a non-volatile memory or the like, and stores various programs and data. Moreover, the storage unit 25 stores the vehicle ID of the UGV 2. The control unit 26 includes at least one CPU, a ROM, a RAM, and the like, and executes various types of control according to a program stored in the ROM (or the storage unit 25). The various types of control include the travel control and article transfer control. In the travel control, the control unit 26 controls rotation speeds of the wheels 2a, a position of the UGV 2, and a traveling direction using the position information acquired from the positioning unit 22, the sensing information acquired from the sensor unit 24, and the like.

In a case where the UGV 2 is used for delivery of the delivery request item, delivery plan information acquired from the information processing server 4 is used in the travel control. Moreover, in a case where the UGV 2 is used for mobile sales of the mobile sales item, mobile sales plan information acquired from the information processing server 4 is used in the travel control. The mobile sales plan information includes, for example, article information of the mobile sales item, position information of a sales area, a mobile sales schedule including a scheduled mobile sales date, and an initially set movement method (travel method) of the UGV 2. The movement method includes at least any one of a movement path (travel path) of the UGV 2 and a movement speed (travel speed) of the UGV 2. Incidentally, the movement path of the UGV 2 is, for example, a movement path on a two-dimensional plane represented by latitude and longitude (position information of the movement path).

Furthermore, movement control information acquired from the information processing server 4 is used in the travel control. Here, the movement control information includes a movement method (travel method of the UGV 2) determined based on an operation situation of a user (user in the sales area) with respect to the mobile sales item. The movement method includes at least any one of a movement path (travel path) of the UGV 2 and a movement speed (travel speed) of the UGV 2, and can be changed from the initially set movement method. Incidentally, the movement control information may include an article ID of the mobile sales item ordered by the user and position information indicating the current position of the user who has ordered the mobile sales item.

The control unit 26 can cause the UGV 2 to autonomously travel toward a delivery destination indicated by delivery plan information. Moreover, the control unit 26 can cause the UGV 2 to autonomously travel according to the mobile sales plan information or the movement control information. For example, the control unit 26 can cause the UGV 2 to autonomously travel along the movement path (i.e., in accordance with position information of the movement path) indicated by the mobile sales plan information or the movement control information.

Moreover, in the article transfer control, for example, the control unit 26 provides the article to the recipient (that is, the recipient of the delivery request item or the user who has ordered the mobile sales item), by causing the UGV 2 in a stopped state to open the side door 2c by the side door opening/closing mechanism. The side door 2c may be opened when the recipient of the article inputs an authentication code for unlocking (that is, releasing a lock of the side door 2c) the lock of the side door 2c. In this case, authentication processing is performed using the input authentication code and an authentication code registered in advance. The authentication code from the recipient of the article may be input from an operation panel provided on a front surface of the side door 2c, or may be input from the user terminal 3 of the recipient by near field communication. When authentication is successful (for example, both the authentication codes coincide) in the authentication processing, the control unit 26 unlocks the lock of the side door 2c. Incidentally, there is a case where the article is provided from the UAV 1 used for the delivery of the delivery request item to the UGV 2 by the article transfer control. For example, in a state where the UAV 1 lands on the UGV 2 or the UAV 1 is hovering above the UGV 2, the ceiling door 2d is opened by the ceiling door opening/closing mechanism to carry the article from the UAV 1 into the housing portion 2b.

[1-3. Configuration and Function of User Terminal 3]

Figure 5:
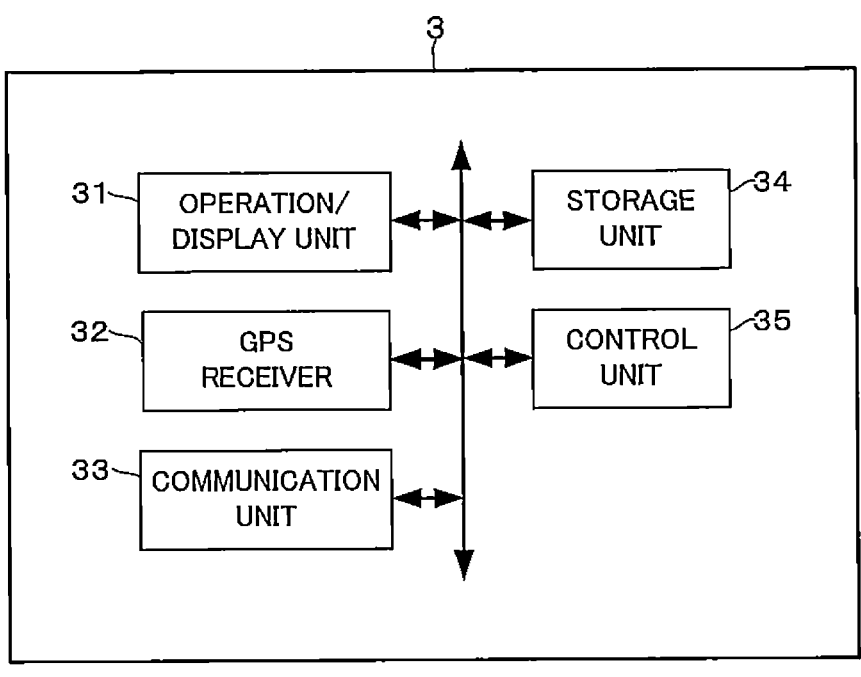
FIG. 5 is a diagram illustrating a schematic configuration example of a user terminal 3.

Next, a configuration and a function of the user terminal 3 will be described with reference to FIG. 5. FIG. 5 is a diagram illustrating a schematic configuration example of the user terminal 3. The user terminal 3 includes an operation/display unit 31, a GPS (Global Positioning System) receiver 32, a communication unit 33, a storage unit 34, a control unit 35, and the like. For example, a smartphone, a tablet, or the like is applicable to the user terminal 3. The operation/display unit 31 has, for example, an input function of receiving an operation by a user's finger, a pen, or the like, and a display function of displaying a UI (User Interface) screen. The GPS receiver 32 receives a radio wave transmitted from a GPS satellite, and detects a current position (latitude and longitude) of the user terminal 3. Position information indicating the position detected by the GPS receiver 32 is output to the control unit 35.

The communication unit 33 has a wireless communication function and is responsible for controlling communication performed via the communication network NW. The position information indicating the current position of the user terminal 3 (the current position of the user) is transmitted to the information processing server 4 by the communication unit 33. The storage unit 34 is configured using a non-volatile memory or the like, and stores various programs and data. The various programs include an operating system (OS), an ordering application for ordering a mobile sales item, and a web browser. Incidentally, the ordering application is preferably downloaded from a predetermined server, connected to the communication network NW, to the user terminal 3.

The control unit 35 includes at least one CPU, a ROM, a RAM, and the like, and executes processing according to the ordering application stored in the ROM (or the storage unit 34). In such processing, the control unit 35 displays the UI screen on the operation/display unit 31 by accessing a mobile sales site that provides various pages related to the mobile sales item. Incidentally, the control unit 35 may access the mobile sales site by designating a URL (Uniform Resource Locator) of the mobile sales site using the web browser. As a result, the UI screen may be displayed based on a web page provided from the information processing server 4. The user of the user terminal 3 can operate the mobile sales item through the UI screen.

Examples of the user's operation on the mobile sales item include an operation for displaying a store screen related to a store that sells the mobile sales item (hereinafter, referred to as a "store browsing operation"), an operation for displaying an item screen related to the mobile sales item (hereinafter, referred to as an "item browsing operation"), an operation for registering the mobile sales item in a cart (hereinafter, referred to as a "cart registration operation"), an operation for displaying an order (purchase) proceeding screen related to the mobile sales item (hereinafter, referred to as an "order proceeding operation"), and an operation for confirming an order for the mobile sales item (hereinafter, referred to as an "order confirmation operation"). Here, each of the store screen, the item screen, and the order proceeding screen is an example of the UI screen. A request for ordering the mobile sales item is transmitted to the information processing server 4 in response to execution of the order confirmation operation by the user. Other examples of the user's operation on the mobile sales item include an operation for registering the mobile sales item as a favorite and an operation for designating a payment method for ordering the mobile sales item. Moreover, as still other examples of the user's operation, there are an operation for accessing the mobile sales site and an operation for browsing the mobile sales site using the ordering application or the web browser. Incidentally, operation information indicating the user's operation on the mobile sales item is transmitted to the information processing server 4.

[1-4. Configuration and Function of Information Processing Server 4]

Figure 6:
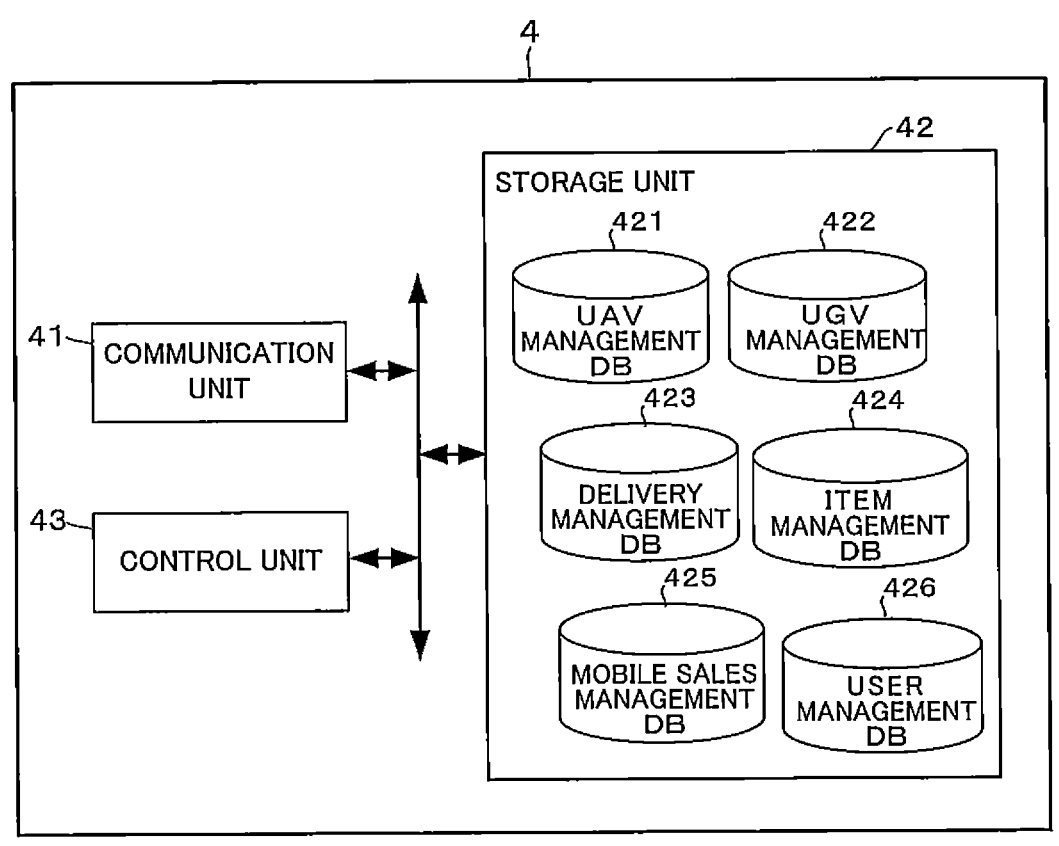
FIG. 6 is a diagram illustrating a schematic configuration example of an information processing server 4.

Next, a configuration and a function of the information processing server 4 will be described with reference to FIG. 6. FIG. 6 is a diagram illustrating a schematic configuration example of the information processing server 4. As illustrated in FIG. 6, the information processing server 4 includes a communication unit 41, a storage unit 42, a control unit 43 (an example of a computer), and the like. The communication unit 41 controls communication performed via the communication network NW. The position information and the vehicle ID transmitted from the UAV 1 are received by the communication unit 41. The information processing server 4 can recognize the current position of the UAV 1 from the position information of the UAV 1. Moreover, the position information and the vehicle ID transmitted from the UGV 2 are received by the communication unit 41. The information processing server 4 can recognize the current position of the UGV 2 from the position information of the UGV 2. Moreover, the position information (position information indicating the current position detected by the user terminal 3) transmitted from the user terminal 3 is received by the communication unit 41. The information processing server 4 can recognize the current position of the user from the position information of the user terminal 3. Further, the operation information transmitted from the user terminal 3 is received by the communication unit 41.

The storage unit 42 is configured using, for example, a hard disk drive or the like, and stores various programs and data. The programs may be stored in a non-transitory computer readable memory. The storage unit 42 stores delivery request information received by the communication unit 41 from a predetermined server (for example, a server that provides an EC site). The delivery request information includes article information of the delivery request item requested by a delivery requester, position information of a delivery destination designated by the delivery requester, and a scheduled delivery date. Incidentally, in a case where the delivery request item is, for example, an item ordered on the EC site, the delivery request information includes store information of a store that handles the delivery request item. The store information of the store includes a store ID of the store and installation position information of the store. The store ID is identification information for identifying the store. Moreover, in the storage unit 42, a UAV management database 421, a UGV management database 422, a delivery management database 423, an item management database 424, a mobile sales management database 425, a user management database 426, and the like are constructed.

The UAV management database 421 is a database for managing information regarding the UAV 1. In the UAV management database 421, a vehicle ID of the UAV 1, a battery capacity (upper limit value) of the UAV 1, a current position of the UAV 1, and the like are stored (registered) in association with each of the UAVs 1 (vehicle IDs). The current position of the UAV 1 is appropriately updated based on the position information from the UAV 1. The UGV management database 422 is a database for managing information regarding the UGV 2. In the UGV management database 422, a vehicle ID of the UGV 2, a battery capacity of the UGV 2, a current position of the UGV 2, and the like are stored in association with each of the UGVs 2 (vehicle IDs). The current position of the UGV 2 is appropriately updated based on the position information from the UGV 2.

The delivery management database 423 is a database for managing information regarding delivery of the delivery request item. The delivery management database 423 stores vehicle information, delivery plan information, and the like of the UV (the UAV 1 or the UGV 2) used for the delivery in association with each of the UVs. Here, the vehicle information includes a vehicle ID of the UV and the like. As described above, the delivery plan information includes the article information of the delivery request item, position information of a delivery destination, a delivery path, a delivery schedule including a scheduled delivery date, and the like. Incidentally, in the case where the delivery request item is, for example, the item ordered on the EC site, the delivery plan information includes the store information of the store that handles the delivery request item.

The article information of the delivery request item includes an article ID of the delivery request item, a name of the delivery request item, a quantity of the delivery request item, an attribute of the delivery request item, and the like. The article ID of the delivery request item is identification information for identifying the delivery request item. The attribute of the delivery request item indicates, for example, at least any one of a type (category) of the delivery request item and specifications of the delivery request item. Such specifications preferably include a size (width×depth×height). Examples of the type of the delivery request item include food, alcoholic beverages (liquor), baby goods, daily necessities, cosmetics, and books. Incidentally, in a case where delivery request items are delivered to a plurality of different delivery destinations, respectively, by the single UAV 1, article information of each of the delivery request items and position information of each of the delivery destinations are included in the delivery plan information.

The item management database 424 is a database for managing information regarding items (including a mobile sales item). In the item management database 424, article information of an item, store information of a store that handles the item, and the like are stored in association with each of the items. Here, the article information of the item includes an article ID of the item, a name of the item, a sales price of the item, a stock of the item, an attribute of the item, and the like. In a case where there is a plurality of stores that handle the item, store information is stored for each of the stores. The attribute of the item indicates, for example, at least any one of a type of the item and specifications of the item.

The mobile sales management database 425 is a database for managing information regarding mobile sales of the mobile sales item. The mobile sales management database 425 stores vehicle information of the UV used for the mobile sales, mobile sales plan information, and the like in association with each of the UVs. Here, as described above, the mobile sales plan information includes article information of the mobile sales item, position information of a sales area, a mobile sales schedule including a scheduled mobile sales date, an initially set movement method of the UV, and the like. The article information of the mobile sales item includes an article ID of the mobile sales item, a name of the mobile sales item, a sales price of the mobile sales item, a quantity of the mobile sales item, an attribute of the mobile sales item, and the like. The mobile sales plan information may include store information of a store that handles the mobile sales item. Incidentally, in a case where a plurality of different mobile sales items are loaded on the single UV, article information of each of the mobile sales items is included in the mobile sales plan information.

The user management database 426 is a database for managing information regarding the user of the user terminal 3. In the user management database 426, a user ID, a password, a name, a person attribute, an address (or residence), a phone number, an e-mail address, a user rank (user attribute), an item purchase (order) history, a favorite item registration history, payment information, and the like of the user of the user terminal 3 are stored in association with each of the users (user IDs). Here, the user ID is identification information for identifying the user, and is used for login (authentication) of the user together with the password. The person attribute includes, for example, an age group, sex, a family structure, and the like. The address (or residence) is an example of location information registered in advance by the user. Incidentally, the location information may be a place of a building where the user works.

The user rank is divided into a plurality of ranks such as rank A, rank B, and rank C, for example, and is set to a higher rank (for example, rank A is the highest) as an order frequency of the item is higher or a total order amount of the items is larger. For example, a user whose user rank is higher than a reference rank (for example, rank B) is hereinafter referred to as a "heavy user", and a user other than the heavy user is referred to as a "normal user". The item purchase history includes, for example, an article ID and a purchase (order) date of an item purchased by the user in the EC site or mobile sales. The item purchase history can be used to set the user rank. The favorite item registration history includes, for example, an article ID and a registration date of an item registered as a favorite by the user in the EC site. The payment information is information used for payment processing of the mobile sales item ordered by the user. The payment information includes information corresponding to a payment method designated by the user. Examples of the payment method that can be used include credit card payment, UID payment (for example, smartphone payment), electronic money payment, real-time debit transfer payment, and point payment.

The control unit 43 includes at least one CPU, a ROM, a RAM, and the like, and performs various processes according to the programs (program code) stored in the storage unit 42 or the non-transitory computer readable memory. The CPU (an example of processor) is configured to access the program code stored in the storage unit 42 or the memory and operate as instructed by the program code. The program code includes: identification code configured to cause the CPU to identify an operation situation on the user terminal 3 in the sales area when the UV is moving to perform mobile sales of mobile sales item, the operation situation being an operation situation of the user with respect to the mobile sales item; and movement control code configured to cause the CPU to perform movement control of the UV on the basis of the operation situation of the user. The movement control code may cause the CPU to determine a movement method according to the operation situation of the user, and move the UV by the determined movement method.

Incidentally, the processor may be implemented using circuitry or processing circuitry which includes general purpose processors, special purpose processors, integrated circuits, ASICs, conventional circuitry and/or combinations thereof which are configured or programmed to perform the disclosed functionality. The processor may be hardware (or a combination of hardware and software) that carry out or are programmed to perform the recited functionality.

Figure 7:
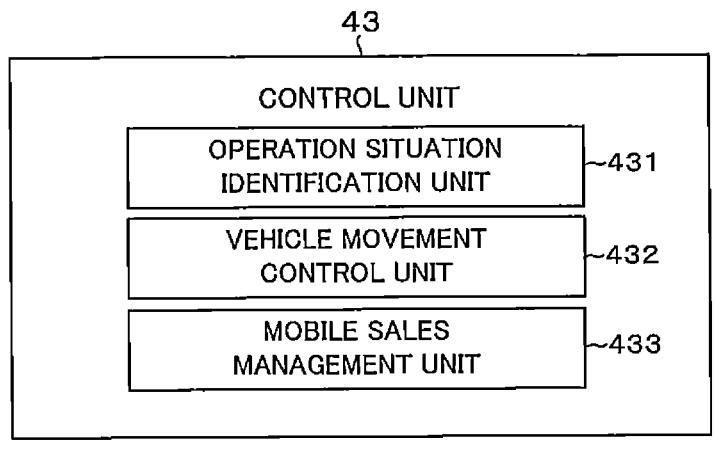
FIG. 7 is a diagram illustrating an example of functional blocks in a control unit 43.

FIG. 7 is a diagram illustrating an example of functional blocks in the control unit 43. As illustrated in FIG. 7, the control unit 43 functions as an operation situation identification unit 431 (an example of an identification unit), a vehicle movement control unit 432 (an example of a movement control unit), a mobile sales management unit 433, and the like according to a program (program code group) stored in, for example, the ROM, the storage unit 42 or the non-transitory computer readable memory.

The operation situation identification unit 431 identifies an operation situation on the user terminal 3 used by the user in the sales area, that is, the operation situation of the user with respect to the mobile sales item (that is, the item loaded on the UV) when the UV is moving (including temporary stop) to perform the mobile sales of the mobile sales item (for example, the UV is present (located) in the sales area or moving towards the sales area). The operation situation can be identified based on the operation information acquired from the user terminal 3 via the communication unit 41. In a case where there are a plurality of the users in the sales area, the operation situation identification unit 431 identifies the operation situation of each of the plurality of the users in the sales area on the user terminal 3 used by each of the users. Moreover, the operation situation is divided into a plurality of stages, for example, from the time when the user moves into the sales area (or immediately before (for example, from a position a predetermined distance before) the user enters the sales area) to order confirmation of the mobile sales item. The stage is also referred to as an order level, and the order level becomes higher in a stage closer to the order confirmation of the mobile sales item (in other words, more likely to reach the order confirmation). Incidentally, the height of the order level is represented by, for example, a numerical value, and it can be said that the order level is higher as the numerical value is larger.

For example, the operation situation of the user on the mobile sales item is divided into a stage before execution of the store browsing operation (an order level "0"), a stage before execution of the item browsing operation after the execution of the store browsing operation (an order level "1"), a stage before execution of the cart registration operation after the execution of the item browsing operation (an order level "2"), a stage before execution of the order proceeding operation after the execution of the cart registration operation (an order level "3"), a stage before execution of the order confirmation operation after the execution of the order proceeding operation (an order level "4"), and the like. Here, the order level "0" is a situation where there is no user operation with respect to the mobile sales item, and it does not matter whether or not the user accesses a mobile sales site. Incidentally, the order level "0" may be further divided depending on whether or not the user is present on a movement path (including a range in the vicinity of the movement path) of the UV. For example, the order level "0" is divided into an order level "0-1" and an order level "0-2". The order level "1" is a situation in which the store screen is being displayed (in other words, a store page is being accessed). The order level "2" is a situation where the item screen is being displayed (in other words, an item page is being accessed). The order level "3" is a situation where the mobile sales item is being registered in the cart. The order level "4" is a situation in which the order proceeding screen is being displayed (in other words, an order proceeding page is being accessed). Moreover, the operation situation of the user with respect to the mobile sales item may be further divided based on an operation for accessing the mobile sales site or an operation for browsing the mobile sales site using the ordering application or the web browser.

Incidentally, the user in the sales area is the user present in the sales area. Whether or not being present in the sales area is determined from position information of the sales area and the current position of the user. The current position of the user is preferably identified based on the position information acquired from the user terminal 3 via the communication unit 41. Alternatively, the current position of the user may be identified based on location information registered in advance by the user. The location information can be acquired from the user management database 426.

The vehicle movement control unit 432 performs (executes) movement control of the UV for performing mobile sales on the basis of the operation situation identified by the operation situation identification unit 431. As described above, the movement control is performed by transmitting the movement control information including the movement method of the UV to the UV via the communication unit 41. For example, the vehicle movement control unit 432 determines a movement method according to the operation situation (that is, the operation situation of the user with respect to the mobile sales item) identified by the operation situation identification unit 431, and moves the UV by the determined movement method. Here, the movement method may be determined by selecting any one movement method from a plurality of movement method candidates. Moreover, the movement method may be determined by adjusting (changing) a preset movement method in accordance with the operation situation of the user.

Incidentally, the movement method according to the operation situation of the user with respect to the mobile sales item means to change at least any one of a movement speed of the UV and a movement path of the UV according to the operation situation of the user. For example, the vehicle movement control unit 432 moves the UV at a slower movement speed in a stage closer to the order confirmation of the mobile sales item (that is, as the order level is higher). For example, the vehicle movement control unit 432 moves, in a case where the operation situation is closer than a first threshold (e.g., the order level "2") to the order confirmation of the mobile sales item, the UV at a movement speed slower than a second threshold (e.g., "7 m/s"). This makes it possible to increase an order opportunity of the mobile sales item and promote the mobile sales. Incidentally, a timing of changing the UV to the slower speed may be a time point when a change in the operation situation of the user is detected, or may be a time point when the UV reaches near the user (for example, reaches a point away from the user by a predetermined distance). Moreover, the vehicle movement control unit 432 moves the UV along a movement path closer to the current position of the user in a stage closer to the order confirmation of the mobile sales item. For example, the vehicle movement control unit 432 moves, in a case where the operation situation is closer than a first threshold to the order confirmation of the mobile sales item, the UV along a movement path where a distance to the current position of the user is closer than a third threshold (e.g., "500 m"). This also makes it possible to increase the order opportunity of the mobile sales item and promote the mobile sales. Alternatively, the vehicle movement control unit 432 moves the UV along a movement path closer to the current position of the user at a slower movement speed in a stage closer to the order confirmation of the mobile sales item. For example, the vehicle movement control unit 432 moves, in a case where the operation situation is closer than a first threshold to the order confirmation of the mobile sales item, the UV at a movement speed slower than a second threshold and along a movement path where a distance to the current position of the user is closer than a third threshold. This makes it possible to further increase the order opportunity of the mobile sales item and promote the mobile sales. Incidentally, the movement path of the UV is preferably set such that the amount of decrease from the battery capacity (the amount of decrease according to a movement distance) of the UV does not exceed a predetermined ratio. The movement path closer to the current position of the user may be selected among a plurality of movement path candidates with different distances from each other, on the basis of the current position of the user and position information of each of the plurality of movement path candidates.

Moreover, in a case where a plurality of the users are present in the sales area, the vehicle movement control unit 432 preferably performs the movement control of the UV for performing the mobile sales on the basis of an operation situation of the user in a stage relatively closer (for example, the closest) to the order confirmation of the mobile sales item among the plurality of the users. For example, the vehicle movement control unit 432 performs the movement control of the UV on the basis of the operation situation of the user whose the operation situation is closer than a first threshold to the order confirmation of the mobile sales item, among the plurality of the users. This makes it possible to increase the possibility of the order confirmation of the mobile sales item and promote the mobile sales. Alternatively, the vehicle movement control unit 432 may perform the movement control of the UV for performing the mobile sales on the basis of an operation situation of a user (for example, a heavy user) having a relatively high user rank among the plurality of the users in the sales area. For example, the vehicle movement control unit 432 performs the movement control of the UV on the basis of an operation situation of the user whose an order frequency or a total order amount of items is larger than a fourth threshold (e.g., "60%" or "10,000 yen"), among the plurality of the users. This also makes it possible to increase the possibility of the order confirmation of the mobile sales item and promote the mobile sales. Moreover, in a case where a plurality of heavy users are included among the plurality of users in the sales area, the movement control of the UV for performing the mobile sales is preferably performed based on an operation situation of a heavy user in a stage closest to the order confirmation of the mobile sales item among the plurality of the heavy users.

Incidentally, the vehicle movement control unit 432 preferably moves the UV at a slower movement speed as a user (for example, heavy user) has a relatively higher order frequency or a relatively larger total order amount of the items. For example, the vehicle movement control unit 432 moves the UV at a movement speed slower than a second threshold on the basis of an operation situation of the user whose an order frequency or a total order amount of items is larger than a fourth threshold, among the plurality of the users. This makes it possible to further increase the possibility of the order confirmation of the mobile sales item and promote the mobile sales. Moreover, as a user (for example, heavy user) has a relatively higher order frequency or a relatively larger total order amount of the items, the UV may be moved along a movement path closer to a current position of the user. The vehicle movement control unit 432 moves the unmanned vehicle along a movement path where a distance to a current position of the user is closer than a third threshold on the basis of an operation situation of the user whose an order frequency or a total order amount of items is larger than a fourth threshold, among the plurality of the users. This also makes it possible to further increase the possibility of the order confirmation of the mobile sales item and promote the mobile sales. The first-fourth threshold are set in advance by the control unit 43.

FIG. 8 is a view illustrating, for each user attribute, an example of a correspondence relationships among operation situations of the user with respect to a mobile sales item, order levels, and movement speeds of the UAV 1. In the example of FIG. 8, the movement speed "13 m/s (normal speed)" of the UAV 1 is associated with the stage before the execution of the store browsing operation of the normal user (not present on the movement path of the UAV 1) in the sales area. Moreover, the movement speed "10 m/s" of the UAV

1 is associated with the stage before the execution of the store browsing operation of the normal user (present on the movement path of the UAV 1) in the sales area. Moreover, the movement speed "8 m/s" of the UAV 1 is associated with the stage before the execution of the item browsing operation after the execution of the store browsing operation of the normal user in the sales area. In this manner, the movement speed of the UAV 1 decreases in a stage closer to the order confirmation of the mobile sales item (that is, the order level is higher). On the other hand, the movement speed "8 m/s" of the UAV 1 is associated with the stage before the execution of the store browsing operation of the heavy user (present on the movement path of the UAV 1) in the sales area. Moreover, the movement speed "7 m/s" of the UAV 1 is associated with the stage before the execution of the item browsing operation after the execution of the store browsing operation of the heavy user in the sales area. In this manner, the movement speed determined based on the operation situation of the heavy user is slower than the movement speed determined based on the operation situation of the normal user.

FIG. 9 is a view illustrating an example of a correspondence relationships among operation situations of the user with respect to a mobile sales item, order levels, and movement paths (candidates) of the UAV 1. In the example of FIG. 9, the movement path "R0 (normal route)" of the UAV 1 is associated with the stage before the execution of the store browsing operation of the user in the sales area. Moreover, the movement path "R1" of the UAV 1 is associated with the stage before the execution of the item browsing operation after the execution of the store browsing operation of the user in the sales area. Moreover, the movement path "R2" of the UAV 1 is associated with the stage before the execution of the cart registration operation after the execution of the item browsing operation of the user in the sales area. Moreover, the movement path "R3" of the UAV 1 is associated with the stage before the execution of the order proceeding operation after the execution of the cart registration operation of the user in the sales area. Moreover, the movement path "R4" of the UAV 1 is associated with the stage before the execution of the order confirmation operation after the execution of the order proceeding operation of the user in the sales area. In this manner, the movement path of the UAV 1 approaches the current position of the user (detours with respect to the normal route) in a stage closer to the order confirmation of the mobile sales item (that is, the order level is higher). For example, the movement path "R4" closer (for example, the closest) to the current position of the user is determined (selected) among the plurality of movement path candidates (R0-R4).

Incidentally, the vehicle movement control unit 432 may perform the movement control of the UV on the basis of an operation situation of a user closest (closest in terms of time or distance) to a current position of the UV for performing the mobile sales among the plurality of the users in the sales area. Moreover, the vehicle movement control unit 432 may perform the movement control of the UV on the basis of an operation situation of a user closest (closest in terms of time or distance) to the movement path of the UV for performing the mobile sales among the plurality of the users in the sales area. Moreover, the vehicle movement control unit 432 may perform the movement control of the UV on the basis of an operation situation of a user having a person attribute corresponding to an attribute of the mobile sales item loaded on the UV among the plurality of the users in the sales area. For example, in a case where the mobile sales item is an item for women, the movement control of the UV may be performed based on an operation situation of a female user. Alternatively, in a case where the mobile sales item is an item popular among young people, the movement control of the UV may be performed based on an operation situation of a young user.

The mobile sales management unit 433 manages the current position of the UV moving for the mobile sales and the mobile sales items loaded on the UV (including inventory management). Moreover, the mobile sales management unit 433 transmits, via the communication unit 41, article information of an orderable mobile sales item among the mobile sales items loaded on the UV to the user terminal 3 accessing the mobile sales site. As a result, the article information of the orderable mobile sales item is displayed on the user terminal 3. Moreover, the mobile sales management unit 433 preferably notifies a user present in a sales area of the UV moving for the mobile sales of a message indicating that the UV is present near the user. Alternatively, the mobile sales management unit 433 may notify a user present on a movement path (including a range in the vicinity of the movement path) of the UV moving for the mobile sales or within a predetermined distance (for example, 50 m to 100 m) from the current position of the UV of the message indicating that the UV is present near the user. Incidentally, the notification of the message may be performed by transmitting an e-mail to a mail address of the user, or may be performed by transmitting the message by a SMS (Short Message Service) to a phone number of the user. Alternatively, the message may be transmitted via a predetermined application or website, for example, by a pop-up message or a notice.

Moreover, the mobile sales management unit 433 receives, via the communication unit 41, an order request transmitted from the user terminal 3 in response to the execution of the order confirmation operation by the user, and executes payment processing in response to the order request. Here, the order request includes, for example, a user ID of the user of the user terminal 3, an article ID of the mobile sales item ordered by the user, an order quantity, a payment method designated by the user, and the like. The payment processing is executed based on payment information corresponding to the payment method designated by the user, and a sales price and the quantity of the mobile sales item ordered by the user. As a result, the order for the mobile sales item is confirmed. When the order for the mobile sales item is confirmed, the movement control information for moving the mobile sales item to the current position of the user who has ordered the mobile sales item is transmitted, via the communication unit 41, to the UV on which the mobile sales item is loaded. The movement control information includes, for example, position information indicating the current position of the user who has ordered the mobile sales item. As a result, the UV on which the mobile sales item is loaded moves to the current position of the user, and the mobile sales item can be provided to the user.

[2. Operation of Movement Control System S]

Next, an operation example of the movement control system S will be described separately for Example 1 and Example 2. Example 1 is an operation example in a case where delivery of a delivery request item and the mobile sales of the mobile sales item are performed by the UV. Example 2 is an operation example in a case where only the mobile sales of the mobile sales item is performed by the UV regardless of the delivery of the delivery request item.

Example 1

First, an operation of the movement control system S in Example 1 will be described with reference to FIGS. 10 and

11. FIG. 10 is a sequence diagram illustrating an example of the operation of the movement control system S in a case where the delivery of the delivery request item and the mobile sales of the mobile sales item are performed by the UV. FIG. 11 is a flowchart illustrating a specific example of mobile sales control processing in step S11 of FIG. 10.

Figure 10:
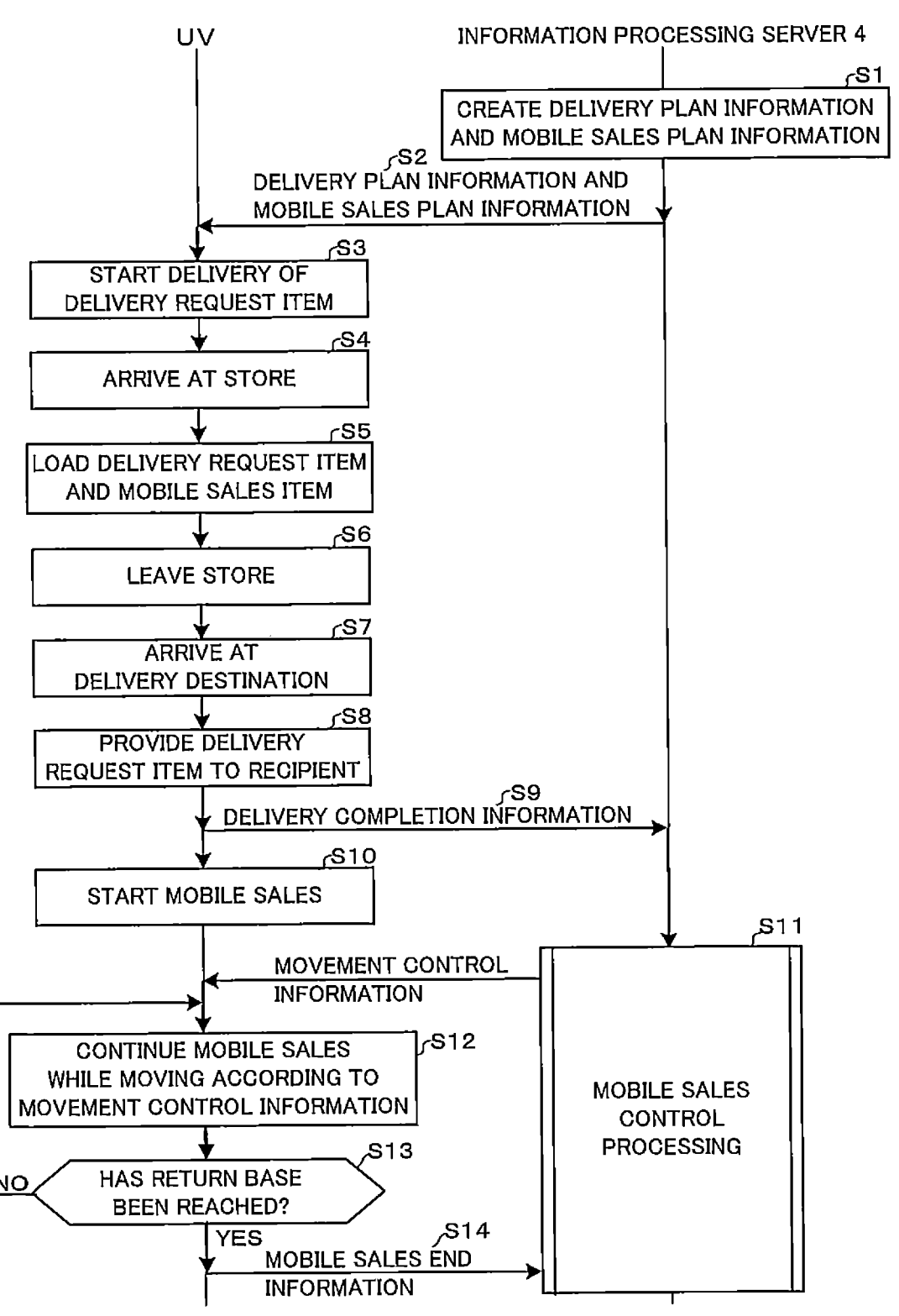
FIG. 10 is a sequence diagram illustrating an example of an operation of the movement control system S in a case where the delivery of the delivery request item and the mobile sales of the mobile sales item are performed by an UV.
Figure 11:
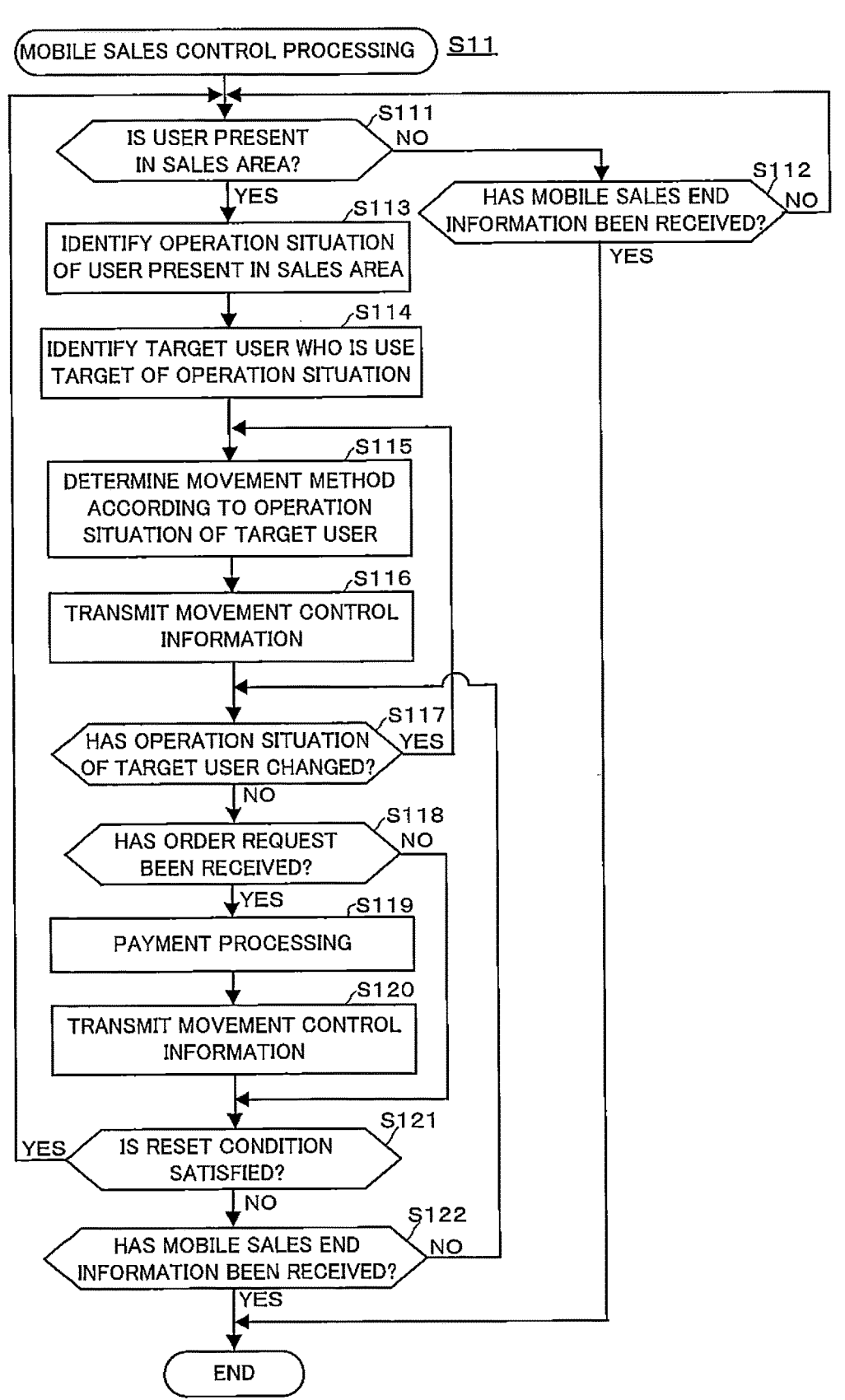
FIG. 11 is a flowchart illustrating a specific example of mobile sales control processing in step S11 of FIG. 10.

In FIG. 10, when receiving delivery request information from a predetermined server, the information processing server 4 creates delivery plan information and mobile sales plan information on the basis of the delivery request information and the like (step S1). Incidentally, the delivery plan information includes article information of the delivery request item, position information of a delivery destination, a delivery path, a scheduled delivery date, store information of a store that handles the delivery request item, and the like. Moreover, in creating the mobile sales plan information, a movement method (for example, including a movement path and a movement speed) of the UV selected for the delivery and the mobile sales, the sales area, and the mobile sales items, are set. Here, for example, the information processing server 4 preferably sets (initially sets) a return path (for example, the shortest route) from the delivery destination to a return base of the UV as the movement path of the UV. Moreover, the information processing server 4 is preferably set an area corresponding to the delivery path as the sales area. Moreover, the information processing server 4 is preferably set, as the sales area, an area including at least an initially set movement path and having a predetermined size capable of coping with the subsequent path change.

Moreover, the information processing server 4 preferably sets one or more the mobile sales items based on information of a facility present in the sales area or information of a user present in the sales area. For example, one or more items corresponding to a person attribute (for example, female) of a person who uses the facility present in the sales area (for example, the mobile sales items being items for women) or one or more items corresponding to a person attribute of the user present in the sales area is set as the mobile sales items. In a case where a plurality of the users are present in the sales area, an item corresponding to a person attribute that is largest in number is preferably set as the mobile sales item. Moreover, the information processing server 4 may set the mobile sales item based on a purchase tendency (for example, a purchased item) of the user present in the sales area. In the case where the plurality of the users are present in the sales area, the mobile sales item is preferably set based on an item purchased by the largest number of the users. Incidentally, the purchase tendency of the user can be identified based on an item purchase history of the user present in the sales area. Moreover, the information processing server 4 may set an item corresponding to the attribute of the delivery request item as the mobile sales item.

Next, the information processing server 4 transmits the delivery plan information and the mobile sales plan information created in step S1 to the UV (the UAV 1 or the UGV 2) selected for the delivery and the mobile sales (step S2). When receiving the delivery plan information and the mobile sales plan information from the information processing server 4, the UV starts (that is, leaves a departure base) the delivery of the delivery request item according to the delivery plan information (step S3). Next, when arriving at a store indicated by the delivery plan information (step S4), the UV loads the delivery request item indicated by the delivery plan information and loads the mobile sales items indicated by the mobile sales plan information (step S5).

Next, the UV leaves the store (step S6) and arrives at the delivery destination (step S7), then performs article transfer control to provide the delivery request item to a recipient (step S8). Next, the UV transmits delivery completion information indicating completion of the delivery of the delivery request item to the information processing server 4 (step S9), and starts the mobile sales while moving along the movement path indicated by the mobile sales plan information (step S10). When receiving the delivery completion information from the UV, the information processing server 4 performs the mobile sales control processing (step S11). Incidentally, a specific example of the mobile sales control processing will be described later.

Next, when receiving movement control information from the information processing server 4, the UV continues the mobile sales while moving according to the movement control information (step S12). Next, the UV determines whether or not the UV has reached the return base (step S13). In a case where it is determined that the vehicle has not reached the return base (step S13: NO), the processing returns to step S12. On the other hand, in a case where it is determined that the vehicle has reached the return base (step S13: YES), mobile sales end information indicating the end of the mobile sales is transmitted to the information processing server 4 (step S14). Incidentally, the UV may return to the return base located in a place different from the departure base.

Next, the specific example of the mobile sales control processing in step S11 will be described with reference to FIG. 11. In the mobile sales control processing, as illustrated in FIG. 11, the control unit 43 of the information processing server 4 determines whether or not the user (the user of the user terminal 3 accessing a mobile sales site) is present in the sales area indicated by the mobile sales plan information (step S111). Incidentally, whether or not the user is present in the sales area is determined based on position information of the sales area indicated by the mobile sales plan information and position information from the user terminal 3 accessing the mobile sales site. Alternatively, whether or not the user is present in the sales area is determined based on the position information of the sales area and location information registered in advance by the user of the user terminal 3 accessing the mobile sales site. Alternatively, whether or not the user is present in the sales area may be determined based on the position information of the sales area indicated by the mobile sales plan information and position information from the user terminal 3 without determining whether or not the user terminal 3 accesses the mobile sales site.

In a case where it is determined that the user is not present in the sales area (step S111: NO), the processing proceeds to step S112. On the other hand, in a case where it is determined that the user is present in the sales area (step S111: YES), the processing proceeds to step S113. In step S112, the control unit 43 determines whether or not the mobile sales end information has been received from the UV. In a case where it is determined that the mobile sales end information has not been received from the UV (step S112: NO), the processing returns to step S111. On the other hand, in a case where it is determined that the mobile sales end information has been received from the UV (step S112: YES), the processing illustrated in FIG. 11 ends.

In step S113, the control unit 43 (the operation situation identification unit 431) identifies an operation situation (that is, the operation situation for the mobile sales items) of the user present in the sales area as described above. Here, in a case where a plurality of the users are present in the sales area, operation situations of the respective users are identified. Incidentally, the operation situation identified in this manner is updated based on operation information from the user terminal 3 of the user corresponding thereto. Next, the control unit 43 identifies a target user who is a use target of the operation situation identified in step S113 (step S114). In a case where the operation situation of one user is identified in step S113, the user is identified as the target user.

On the other hand, in a case where the operation situations of the plurality of the users are identified in step S113, a user in a stage closest to the order confirmation of the mobile sales item among the plurality of the users is preferably identified as the target user. Here, in identifying the target user, a user having a relatively high user rank (for example, a heavy user) is preferably prioritized. For example, in a case where an operation situation of a normal user and an operation situation of the heavy user are the same (that is, at the same order level), the heavy user is identified as the target user. Incidentally, in identifying the target user, a user having a relatively short distance from a current position of the UV (or the movement path of the UV) performing the mobile sales to a current position of the user for which the operation situation has been identified may be prioritized. Alternatively, a user having a person attribute corresponding to an attribute of the mobile sales item loaded on the UV may be prioritized in identifying the target user.

Next, the control unit 43 (the vehicle movement control unit 432) determines a movement method according to the operation situation identified in step S114 (step S115). For example, a slower movement speed is determined in a stage closer to the order confirmation of the mobile sales item. That is, the closer the stage is to the order confirmation for mobile sales item, the slower the movement speed is determined. Moreover, a movement path closer to a current position of the target user is determined in a stage closer to the order confirmation of the mobile sales item. That is, the closer the stage is to the order confirmation for the mobile sales item, the closer the movement path to the target user's current location is determined. Incidentally, a slower movement speed may be determined as the target user (for example, the heavy user) has a relatively higher order frequency or a relatively larger total order amount of an items. Moreover, a movement path closer to the current position of the target user may be determined as the target user (for example, the heavy user) has a relatively higher order frequency or a relatively larger total order amount of the items. Incidentally, the movement method determined in step S115 may be the same as the movement method initially set in the mobile sales plan information.

Next, the control unit 43 (the vehicle movement control unit 432) transmits the movement control information including the movement method determined in step S115 to the UV via the communication unit 41 (step S116). As a result, when receiving the movement control information from the information processing server 4, the UV moves according to the changed movement method in a case where the movement method included in the movement control information is changed from a previously acquired movement method. Next, the control unit 43 determines whether or not the operation situation of the target user has changed (step S117). In a case where it is determined that the operation situation of the target user has changed (step S117: YES), the processing returns to step S115. On the other hand, in a case where it is determined that the operation situation of the target user has not changed (step S117: NO), the processing proceeds to step S118.

In step S118, the control unit 43 determines whether or not an order request has been received from the user terminal 3. Incidentally, the user terminal 3 that has transmitted the order request is not necessarily the target user identified in step S114. In a case where it is determined that the order request has been received from the user terminal 3 (step S118: YES), the processing proceeds to step S119. On the other hand, in a case where it is determined that the order request has not been received from the user terminal 3 (step S118: NO), the processing proceeds to step S121.

In step S119, the control unit 43 (the mobile sales management unit 433) executes payment processing in response to the order request received in step S118. Next, the control unit 43 (the vehicle movement control unit 432) transmits movement control information for moving the UV to a current position of a user who has ordered the mobile sales item (that is, the user who has performed an order confirmation operation) to the UV via the communication unit 41 (step S120), and the processing proceeds to step S121. The UV moves to the current position of the user according to the movement control information from the information processing server 4, and performs article transfer control to provide the ordered mobile sales item to the user. At this time, the UV updates the article information (for example, quantity) of the orderable mobile sales items in the mobile sales plan information. Thereafter, the UV returns to the return base while continuing the mobile sales.

In step S121, the control unit 43 determines whether or not a predetermined reset condition is satisfied. Here, the reset condition is a condition for re-identifying a target user. Examples of the reset condition include disconnection (for example, the end of the ordering application) of access from the user terminal 3 of the target user, exit of the target user from the sales area, elapse of a predetermined time (for example, several tens of minutes) from transmission of the movement control information, and the like. Incidentally, the reset condition may be that an operation situation of a user at a higher user rank than the target user has reached a stage closer to the order confirmation than the operation situation of the target user.

In a case where it is determined that the predetermined reset condition is satisfied (step S121: YES), the processing returns to step S111. On the other hand, in a case where it is determined that the predetermined reset condition is not satisfied (step S121: NO), the processing proceeds to step S122. In step S122, the control unit 43 determines whether or not the mobile sales end information has been received from the UV. In a case where it is determined that the mobile sales end information has not been received from the UV (step S122: NO), the processing returns to step S117. On the other hand, in a case where it is determined that the mobile sales end information has been received from the UV (step S122: YES), the processing illustrated in FIG. 11 ends.

Incidentally, although it is assumed that the delivery of the delivery request item and the mobile sales of the mobile sales items are performed by the same UV (one UV) in the above operation example, the delivery of the delivery request item and the mobile sales of the mobile sales items may be performed by different UVs (two UVs). For example, in a case where the delivery of the delivery request item is performed by the UAV 1 and the mobile sales of the mobile sales items is performed by the UGV 2, the information processing server 4 also transmits the mobile sales plan information to the UGV 2 selected for the mobile sales. The UAV 1 provides the delivery request item to a recipient at a delivery destination, and then, moves from the delivery destination to a meeting place (for example, a UGV base)

with the UGV 2. Then, when arriving at the meeting place, the UAV 1 provides the mobile sales items to the UGV 2 by performing the article transfer control. When the mobile sales items provided from the UAV 1 is loaded, the UGV 2 starts the mobile sales in accordance with the mobile sales plan information (step S10). Thereafter, the processing from steps S11 to S14 is performed in the same manner as described above. Alternatively, the UGV 2 may move to a store that handles the mobile sales items according to store information included in the mobile sales plan information, and load the mobile sales items in the store. In this case, the UAV 1 does not need to load the mobile sales items in step S5 described above.

Example 2

Figure 12:
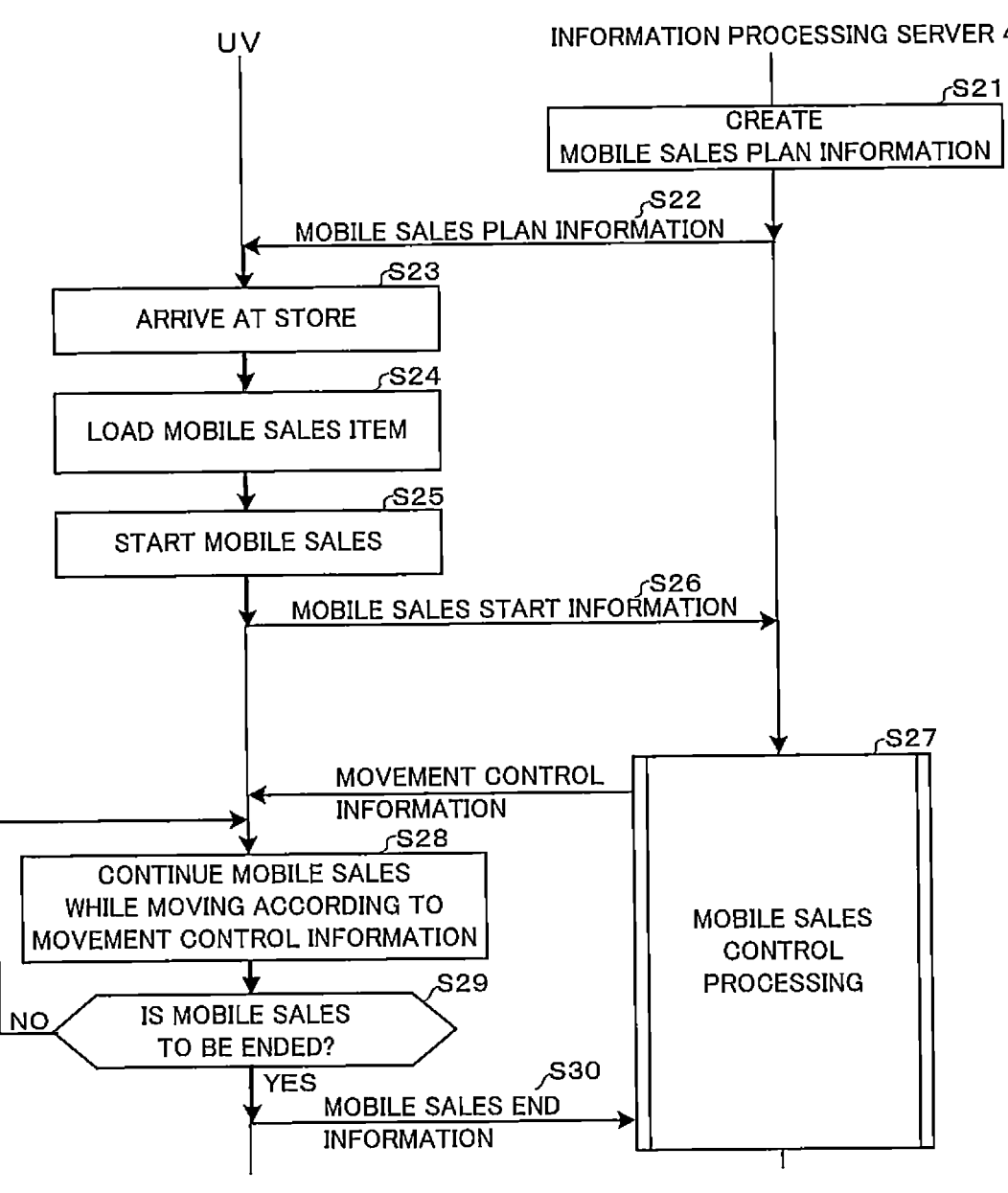
FIG. 12 is a sequence diagram illustrating an example of an operation of the movement control system S in a case where the mobile sales of the mobile sales item is performed by the UV regardless of the delivery of the delivery request item.

Next, an operation of the movement control system S in Example 2 will be described with reference to FIG. 12. FIG. 12 is a sequence diagram illustrating an example of the operation of the movement control system S in a case where the mobile sales of the mobile sales items are performed by the UV regardless of the delivery of the delivery request item.

In FIG. 12, the information processing server 4 creates mobile sales plan information in response to, for example, an instruction from an administrator of the mobile sales (step S21). Incidentally, the mobile sales plan information includes article information of the mobile sales items, position information of the sales area, a mobile sales schedule including a scheduled mobile sales date, an initially set movement method of the UV, store information of a store that handles the mobile sales items, and the like. In creating the mobile sales plan information, the movement method of the UV selected for the mobile sales, the sales area, and the mobile sales items are set. Here, for example, the information processing server 4 may set (initially set) a movement path determined in advance as the movement path of the UV. Moreover, the information processing server 4 may set a control (jurisdiction) area of the UV base (UAV base or UGV base) as the sales area. Moreover, the information processing server 4 is preferably set, as the sales area, an area including at least an initially set movement path and having a predetermined size capable of coping with the subsequent path change, which is similar to Example 1. Moreover, the information processing server 4 preferably sets one or more the mobile sales items based on information of a facility present in the sales area or information of a user present in the sales area, which is similar to Example 1.

Next, the information processing server 4 transmits the mobile sales plan information created in step S21 to the UV (the UAV 1 or the UGV 2) selected for the mobile sales (step S22). When receiving the mobile sales plan information from the information processing server 4, the UV moves to the store indicated by the mobile sales plan information. Then, when arriving at the store (step S23), the UV loads the mobile sales items indicated by the mobile sales plan information (step S24).

Next, the UV starts the mobile sales of the mobile sales items according to the mobile sales plan information (step S25), and transmits mobile sales start information indicating the start of the mobile sales to the information processing server 4 (step S26). When receiving the mobile sales start information from the UV, the information processing server 4 performs mobile sales control processing (step S27). As such mobile sales control processing, the mobile sales control processing illustrated in FIG. 11 can be applied as in Example 1. When receiving the movement control information from the information processing server 4, the UV continues the mobile sales while moving in accordance with the movement control information as in Example 1 (step S28).

Next, the UV determines whether or not to end the mobile sales (step S29). For example, in a case where the movement along the movement path is completed or an end time of the mobile sales arrives, it is determined to end the mobile sales. In a case where it is determined not to end the mobile sales (step S29: NO), the processing returns to step S28. On the other hand, in a case where it is determined to end the mobile sales (step S29: YES), mobile sales end information indicating the end of the mobile sales is transmitted to the information processing server 4 (step S30).

As described above, according to the embodiment, when the UV for performing the mobile sales of the mobile sales item is located in the sales area (for example, is moving in the sales area), the movement control system S identifies an operation situation on the user terminal 3 in the sales area, and performs movement control of the UV on the basis of the identified operation situation, and thus, the degree (level) of interest in the mobile sales item can be determined (assessed) in real time, and the movement control of the UV can be efficiently performed.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the embodiment, the UV performing the mobile sales may be configured to function as the operation situation identification unit 431 and the vehicle movement control unit 432 instead of the information processing server 4. In this case, the control unit (16 or 26) of the UV receives position information indicating a current position of the user terminal 3 and operation information indicating the user's operation on the mobile sales item from the user terminal 3 (or the information processing server 4) via the communication network NW. Then, the control unit (16 or 26) identifies the operation situation of the user with respect to the mobile sales item in the sales area based on the received operation information, and performs the movement control of the UV on the basis of the identified operation situation. Moreover, the example in which the UV performing delivery of a delivery request item loads the delivery request item in a store has been described in the embodiment, but instead, the UV performing the delivery of the delivery request item may be configured to load the delivery request item in a departure base. Moreover, the example in which the UV performing mobile sales loads a mobile sales item in a store has been described in the embodiment, but instead, the UV may be configured to load the mobile sales item in a departure base.

Note

[1] A control device according to the present disclosure includes: an identification unit configured to identify an operation situation on a terminal used by a user in a sales area when an unmanned vehicle is moving to perform mobile sales of an item, the operation situation being an operation situation of the user with respect to the item; and a movement control unit configured to perform movement control of the unmanned vehicle on the basis of the operation situation of the user. This makes it possible to determine a degree of interest in an item to be subjected to the mobile sales in real time and efficiently perform the movement control of the unmanned vehicle.

[2] In the control device described in [1] above, the movement control unit determines a movement method according to the operation situation of the user, and moves the unmanned vehicle by the determined movement method. This makes it possible to more efficiently perform the movement control of the unmanned vehicle.

[3] In the control device described in [2] above, the movement method includes at least any one of a movement speed of the unmanned vehicle and a movement path of the unmanned vehicle.

[4] In the control device described in any one of [1] to [3] above, the operation situation of the user is divided into a plurality of stages until order confirmation of the item, and the movement control unit moves, in a case where the operation situation is closer than a first threshold to the order confirmation, the unmanned vehicle at a movement speed slower than a second threshold. This makes it possible to increase an order opportunity of the item and promote the mobile sales.

[5] In the control device described in any one of [1] to [3] above, the operation situation of the user is divided into a plurality of stages until order confirmation of the item, and the movement control unit moves, in a case where the operation situation is closer than a first threshold to the order confirmation, the unmanned vehicle along a movement path where a distance to a current position of the user is closer than a third threshold. This makes it possible to increase an order opportunity of the item and promote the mobile sales.

[6] In the control device described in any one of [1] to [3] above, the operation situation of the user is divided into a plurality of stages until order confirmation of the item, and the movement control unit moves, in a case where the operation situation is closer than a first threshold to the order confirmation, the unmanned vehicle at a movement speed slower than a second threshold and along a movement path where a distance to a current position of the user is closer than a third threshold. This makes it possible to further increase an order opportunity of the item and promote the mobile sales.

[7] In the control device described in any one of [1] to [6] above, the operation situation of the user is divided into a plurality of stages until order confirmation of the item, the identification unit identifies the operation situation of the user on each of the terminals respectively used by a plurality of the users in the sales area, and the movement control unit performs the movement control of the unmanned vehicle on the basis of the operation situation of the user whose the operation situation is closer than a first threshold to the order confirmation, among the plurality of the users. This makes it possible to increase the possibility of an order confirmation of the item and promote the mobile sales.

[8] In the control device described in any one of [1] to [7] above, the operation situation of the user is divided into a plurality of stages until order confirmation of the item, the identification unit identifies the operation situation of the user on each of the terminals respectively used by a plurality of the users in the sales area, and the movement control unit performs the movement control of the unmanned vehicle on the basis of an operation situation of the user whose an order frequency or a total order amount of items is larger than a fourth threshold, among the plurality of the users. This makes it possible to increase the possibility of an order confirmation of the item and promote the mobile sales.

[9] In the control device described in [7] or [8] above, the movement control unit moves the unmanned vehicle at a movement speed slower than a second threshold on the basis of an operation situation of the user whose an order frequency or a total order amount of items is larger than a fourth threshold, among the plurality of the users. This makes it possible to further increase the possibility of an order confirmation of the item and promote the mobile sales.

[10] In the control device described in [7] or [8] above, the movement control unit moves the unmanned vehicle along a movement path where a distance to a current position of the user is closer than a third threshold on the basis of an operation situation of the user whose an order frequency or a total order amount of items is larger than a fourth threshold, among the plurality of the users. This makes it possible to further increase the possibility of an order confirmation of the item and promote the mobile sales.

[11] In the control device described in [5] or [6] above, the control device according to claim 5, wherein the movement control unit identifies the current position of the user on the basis of position information indicating the current position detected by the terminal, the position information being acquired from the terminal.

[12] In the control device described in [5] or [6] above, the movement control unit identifies the current position of the user on the basis of location information registered in advance by the user.

[13] A movement control method according to the present disclosure includes: identifying an operation situation on a terminal used by a user in a sales area when an unmanned vehicle is moving to perform mobile sales of an item, the operation situation being an operation situation of the user with respect to the item; and performing movement control of the unmanned vehicle on the basis of the operation situation of the user.

[14] A program according to the present disclosure, is configured to cause a computer to: identify an operation situation on a terminal used by a user in a sales area when an unmanned vehicle is moving to perform mobile sales of an item, the operation situation being an operation situation of the user with respect to the item; and perform movement control of the unmanned vehicle on the basis of the operation situation of the user.

REFERENCE SIGNS LIST

1 UAV
2 UGV
3 User terminal
4 Information processing server
11 Drive unit
12 Positioning unit
13 Communication unit
14 Sensor unit
15 Storage unit
16 Control unit
21 Drive unit
22 Positioning unit 23 Communication unit
24 Sensor unit
25 Storage unit
26 Control unit
31 Operation/display unit
32 GPS receiver
33 Communication unit
34 Storage unit
35 Control unit
41 Communication unit
42 Storage unit
43 Control unit
431 Operation situation identification unit
432 Vehicle movement control unit
433 Mobile sales management unit
S Movement control system

What is claimed is:

1. A control device comprising:
at least one memory configured to store program code; and
at least one processor configured to access the program code and operate as instructed by the program code, the program code including:
identification code configured to cause the at least one processor to identify an operation situation on a terminal used by a user in a sales area when an unmanned vehicle is moving to perform mobile sales of an item, the operation situation being an operation situation of the user with respect to the item, wherein the operation situation is divided into a plurality of stages until order confirmation of the item, and an order level becomes higher in a stage closer to the order confirmation of the item; and
movement control code configured to cause the at least one processor to perform one movement control, selected from among a plurality of different movement controls of the unmanned vehicle, in accordance with the order level.

2. The control device according to claim 1, wherein the movement control code is configured to cause the at least one processor to determine a movement method according to the operation situation of the user, and move the unmanned vehicle by the determined movement method.

3. The control device according to claim 2, wherein the movement method includes at least any one of a movement speed of the unmanned vehicle and a movement path of the unmanned vehicle.

4. The control device according to claim 1, wherein
the operation situation of the user is divided into a plurality of stages until order confirmation of the item, and
the movement control code is configured to cause the at least one processor to move, in a case where the operation situation is closer than a first threshold to the order confirmation, the unmanned vehicle at a movement speed slower than a second threshold.

5. The control device according to claim 1, wherein
the operation situation of the user is divided into a plurality of stages until order confirmation of the item, and
the movement control code is configured to cause the at least one processor to move, in a case where the operation situation is closer than a first threshold to the order confirmation, the unmanned vehicle along a movement path where a distance to a current position of the user is closer than a third threshold.

6. The control device according to claim 1, wherein the operation situation of the user is divided into a plurality of stages until order confirmation of the item, and the movement control code is configured to cause the at least one processor to move, in a case where the operation situation is closer than a first threshold to the order confirmation, the unmanned vehicle at a movement speed slower than a second threshold and along a movement path where a distance to a current position of the user is closer than a third threshold.

7. The control device according to claim 1, wherein the operation situation of the user is divided into a plurality of stages until order confirmation of the item, the identification code is configured to cause the at least one processor to identify the operation situation of the user on each of the terminals respectively used by a plurality of the users in the sales area, and the movement control code is configured to cause the at least one processor to perform the one movement control, selected from among a plurality of different movement controls of the unmanned vehicle, in accordance with the order level, based on the user whose the operation situation is closer than a first threshold to the order confirmation, among the plurality of the users.

8. The control device according to claim 1, wherein the operation situation of the user is divided into a plurality of stages until order confirmation of the item, the identification code is configured to cause the at least one processor to identify the operation situation of the user on each of the terminals respectively used by a plurality of the users in the sales area, and the movement control code is configured to cause the at least one processor to perform the movement control of the unmanned vehicle on the basis of an operation situation of the user whose an order frequency or a total order amount of items is larger than a fourth threshold, among the plurality of the users.

9. The control device according to claim 7, wherein the movement control code is configured to cause the at least one processor to move the unmanned vehicle at a movement speed slower than a second threshold on the basis of an operation situation of the user whose an order frequency or a total order amount of items is larger than a fourth threshold, among the plurality of the users.

10. The control device according to claim 7, wherein the movement control code is configured to cause the at least one processor to move the unmanned vehicle along a movement path where a distance to a current position of the user is closer than a third threshold on the basis of an operation situation of the user whose an order frequency or a total order amount of items is larger than a fourth threshold, among the plurality of the users.

11. The control device according to claim 5, wherein the movement control code is configured to cause the at least one processor to identify the current position of the user on the basis of position information indicating the current position detected by the terminal, the position information being acquired from the terminal.

12. The control device according to claim 5, wherein the movement control code is configured to cause the at least one processor to identify the current position of the user on the basis of location information registered in advance by the user.

13. A movement control method executed by one or more computers, comprising:

identifying an operation situation on a terminal used by a user in a sales area when an unmanned vehicle is moving to perform mobile sales of an item, the operation situation being an operation situation of the user with respect to the item, wherein the operation situation is divided into a plurality of stages until order confirmation of the item, and an order level becomes higher in a stage closer to the order confirmation of the item; and performing one movement control, selected from among a plurality of different movement controls of the unmanned vehicle, in accordance with the order level.

14. A non-transitory computer readable memory having stored thereon a program configured to cause a computer to:

identify an operation situation on a terminal used by a user in a sales area when an unmanned vehicle is moving to perform mobile sales of an item, the operation situation being an operation situation of the user with respect to the item, wherein the operation situation is divided into a plurality of stages until order confirmation of the item, and an order level becomes higher in a stage closer to the order confirmation of the item; and perform one movement control, selected from among a plurality of different movement controls of the unmanned vehicle, in accordance with the order level.

15. The control device according to claim 1, wherein the operation situation includes at least one of:

an operation for displaying a store screen related to a store that sells the item, an operation for displaying an item screen related to the item, an operation for registering the item in a cart, an operation for displaying an order proceeding screen related to the item, or an operation for confirming an order for the item.

16. The control device according to claim 1, wherein the movement control code is configured to cause the at least one processor to move, in a case where the operation situation is closer than a first threshold to the order confirmation of the item, the unmanned vehicle at a movement speed slower than a second threshold.

\* \* \* \* \*